US010793163B2

(12) United States Patent
Matsumoto et al.

(10) Patent No.: US 10,793,163 B2
(45) Date of Patent: Oct. 6, 2020

(54) VEHICLE SYSTEM, VEHICLE CONTROL METHOD, AND VEHICLE CONTROL PROGRAM

(71) Applicant: HONDA MOTOR CO., LTD., Minato-ku, Tokyo (JP)

(72) Inventors: Manabu Matsumoto, Utsunomiya (JP); Hajime Ishihara, Utsunomiya (JP); Kenta Hirayama, Shioya (JP); Muneatsu Minato, Utsunomiya (JP); Yosuke Nishimura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 103 days.

(21) Appl. No.: 15/873,985

(22) Filed: Jan. 18, 2018

(65) Prior Publication Data
US 2018/0229740 A1   Aug. 16, 2018

(30) Foreign Application Priority Data

Feb. 10, 2017   (JP) ................. 2017-023164

(51) Int. Cl.
B60W 50/08 (2020.01)
B60W 10/20 (2006.01)
(Continued)

(52) U.S. Cl.
CPC ............. B60W 50/08 (2013.01); B60N 2/002 (2013.01); B60N 2/0248 (2013.01);
(Continued)

(58) Field of Classification Search
CPC ......... B60W 50/08; B60W 2050/0071; B60W 2050/0095; B60W 2040/0809;
(Continued)

(56) References Cited

U.S. PATENT DOCUMENTS

2017/0120863 A1* 5/2017 Tsunoda ................ B60R 25/014

FOREIGN PATENT DOCUMENTS

CN       104192030       12/2014
GB       1321785         6/1973
(Continued)

OTHER PUBLICATIONS

Chinese Office Action for Chinese Patent Application No. 201810047373.2 dated Mar. 4, 2020.
(Continued)

Primary Examiner — Maceeh Anwari
(74) Attorney, Agent, or Firm — Amin, Turocy & Watson, LLP

(57) ABSTRACT

A vehicle system includes a seat on which an occupant of a vehicle is seated, a first operation reception unit and a second operation reception unit configured to be operated by the occupant, and a seat drive unit configured to change a position of the seat on the basis of an operation received by the first operation reception unit, and return the position of the seat to a position before being changed by the first operation reception unit when an operation is received by the second operation reception unit, and the second operation reception unit is provided at a rearward position relative to a place corresponding to a central portion in a travel direction of a seating portion of the seat in a side member provided in a side portion of the seat.

18 Claims, 12 Drawing Sheets

(51) Int. Cl.
  *B60N 2/02* (2006.01)
  *B60W 30/12* (2020.01)
  *G06K 9/00* (2006.01)
  *B60N 2/00* (2006.01)
  *B60W 50/00* (2006.01)
  *B60W 40/08* (2012.01)

(52) U.S. Cl.
  CPC ............ *B60W 10/20* (2013.01); *B60W 30/12* (2013.01); *G06K 9/00369* (2013.01); *G06K 9/00791* (2013.01); *G06K 9/00838* (2013.01); *B60N 2002/0268* (2013.01); *B60W 2040/0809* (2013.01); *B60W 2040/0881* (2013.01); *B60W 2050/0071* (2013.01); *B60W 2050/0095* (2013.01); *B60W 2420/42* (2013.01); *B60W 2540/043* (2020.02); *B60W 2540/215* (2020.02); *B60W 2556/00* (2020.02)

(58) Field of Classification Search
  CPC ..... B60W 2040/0881; B60W 2420/42; B60W 2600/00; B60W 2540/04; B60W 10/20; B60W 30/12; B60W 2540/28; G06K 9/00791; G06K 9/00369; G06K 9/00838; B60N 2/0244; B60N 2/0248; B60N 2/002; B60N 2002/0268
  USPC .......................................................... 701/41
  See application file for complete search history.

(56) References Cited

FOREIGN PATENT DOCUMENTS

| | | |
|---|---|---|
| JP | 05-029842 | 4/1993 |
| JP | 2844248 | * 1/1999 |
| JP | 2008-265656 | 11/2008 |
| JP | 2010-234981 | 10/2010 |
| JP | 2010-235065 | 10/2010 |
| KR | 101524091 | 5/2015 |

OTHER PUBLICATIONS

Japanese Office Action for Japanese Patent Application No. 2017-023164 dated Sep. 25, 2018.

* cited by examiner

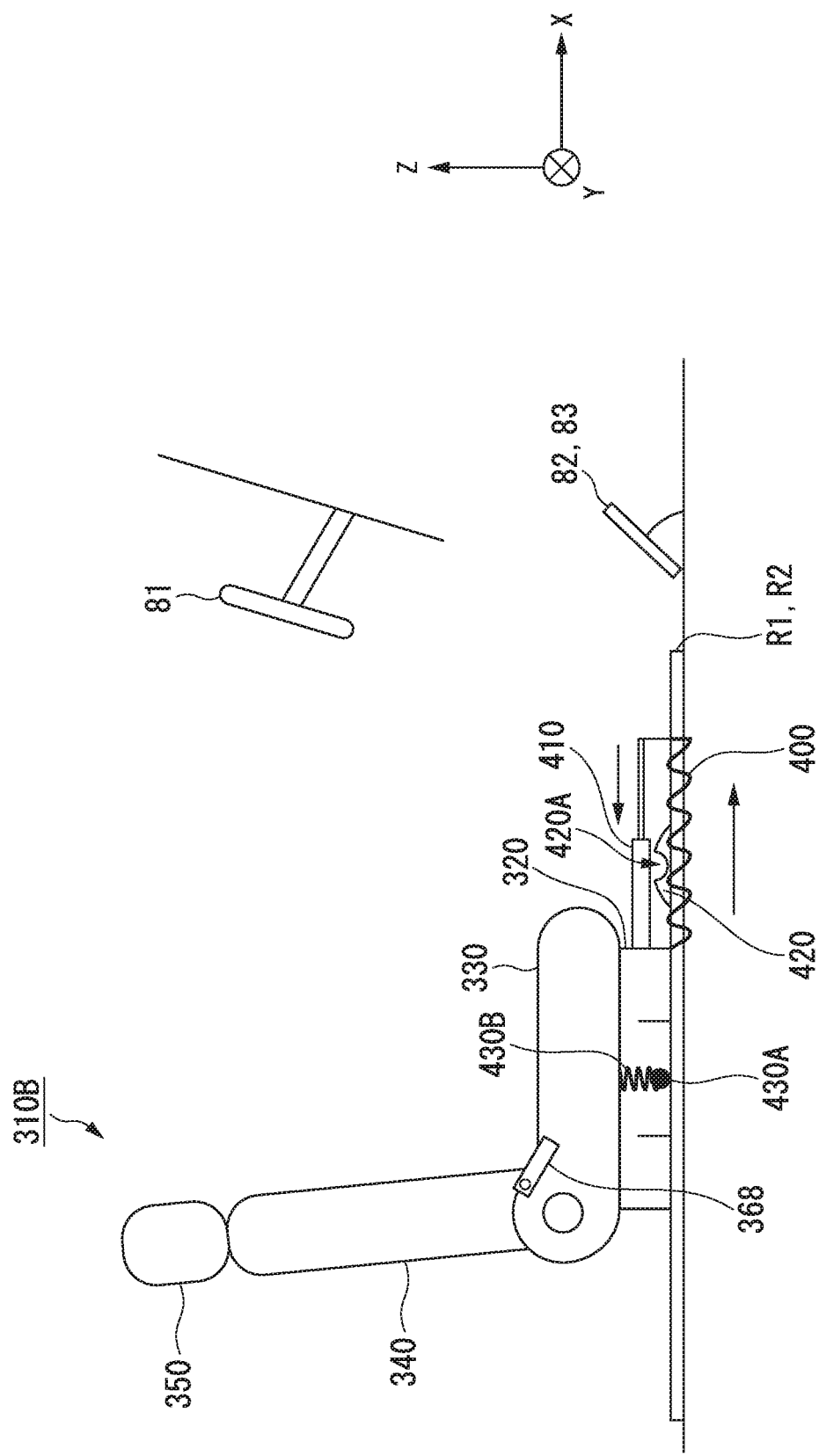

VEHICLE SYSTEM, VEHICLE CONTROL METHOD, AND VEHICLE CONTROL PROGRAM

CROSS-REFERENCE TO RELATED APPLICATION

Priority is claimed on Japanese Patent Application No. 2017-023164, filed Feb. 10, 2017, the content of which is incorporated herein by reference.

BACKGROUND OF THE INVENTION

Field of the Invention

The present invention relates to a vehicle system, a vehicle control method, and a vehicle control program.

Description of Related Art

In recent years, studies have been performed on a technology for controlling a position of a seat on which an occupant is seated, on the basis of a travel state of a vehicle. In relation to this, a technology for moving a seat at a neutral position under drive control of a motor corresponding to a predetermined switch operation has been disclosed (see Japanese Patent No. 2844248, for example).

SUMMARY OF THE INVENTION

However, according to a scheme of the related art, since a switch of a seat is located on the front side or the rear side of a seating portion, an occupant's hand may not reach the switch according to a posture of the seat.

An aspect of the present invention has been made in consideration of such circumstances, and an object thereof is to provide a vehicle system, a vehicle control method, and a vehicle control program capable of improving operability of an operation reception unit.

In order to solve the above problem and achieve the object, the present invention adopts the following aspects.

(1) A vehicle system according to an aspect of the present invention includes: a seat on which an occupant of a vehicle is seated; a first operation reception unit and a second operation reception unit configured to be operated by the occupant; and a seat drive unit configured to change a position of the seat on the basis of an operation received by the first operation reception unit, and return the position of the seat to a position before being changed by the first operation reception unit when an operation is received by the second operation reception unit, wherein the second operation reception unit is provided at a rearward position relative to a place corresponding to a central portion in a travel direction of a seating portion of the seat in a side member provided in a side portion of the seat.

(2) In the aspect (1), the second operation reception unit may be provided on the upper surface side of the side member.

(3) In the aspect (1) or (2), the seat drive unit may validate an operation that is received by the second operation reception unit when the vehicle is executing a first driving mode in which a degree of automatic driving is equal to or greater than a predetermined value.

(4) In the aspect (3), the second operation reception unit is capable of lighting, and the seat drive unit may cause the second operation reception unit to light when the first driving mode is being executed.

(5) In any one of the aspects (1) to (4), the seat drive unit may return the posture of the seat changed by the operation received by the first operation reception unit to a posture before the change when the operation by the second operation reception unit has been received for a predetermined time or more.

(6) In any one of the aspects (1) to (5), the vehicle system may include a plurality of second operation reception units, and the seat drive unit may return the posture of the seat changed by the operation received by the first operation reception unit to a posture before the change when operations have been received by the plurality of second operation reception units.

(7) In the aspect (3) or (4), the vehicle system may further include: a switching control unit configured to control switching between the first driving mode and a second driving mode in which a degree of automatic driving of the vehicle is lower than a predetermined value; and an occupant state determination unit configured to determine whether the occupant is in a posture in which driving the vehicle is possible, wherein the seat drive unit may permit the switching control unit to perform switching from the first driving mode to the second driving mode when the occupant state determination unit determines that the occupant is in the posture in which driving the vehicle is possible.

(8) In the aspect (7), the seat drive unit may permit the switching control unit to perform switching from the first driving mode to the second driving mode when an operation is received by the second operation reception unit again after the posture of the seat changed by the first operation reception unit returns to the posture before the change on the basis of the operation received by the second operation reception unit.

(9) In the aspect (7) or (8), the seat drive unit may return the posture of the seat changed by the operation received by the first operation reception unit to the posture before the change when the operation is received by the second operation reception unit, and change the posture of the seat to a posture of the seat when the first driving mode is executed in a case in which the operation is received by the second operation reception unit after the switching control unit performs switching from the first driving mode to the second driving mode.

(10) In any one of aspects (1) to (8), the vehicle system may further include an occupant detection unit configured to detect that it is likely that an occupant seated on the seat has changed to another occupant, wherein the seat drive unit may change the posture of the seat to a preset basic posture when the occupant detection unit determines that it is likely that the occupant seated on the seat has changed to another occupant and when the operation has been received by the second operation reception unit.

(11) In the aspect (10), the occupant detection unit may detect a load on the seat, and detect that it is likely that the occupant has changed when the detected load on the seat exceeds a threshold value again after the load on the seat is equal to or smaller than the threshold value from a state in which the load on the seat exceeds the threshold value.

(12) In the aspect (10) or (11), the vehicle system further includes: an imaging unit configured to image the inside of a vehicle cabin of the vehicle, wherein the occupant detection unit may analyze an image obtained from the imaging unit, and detect that it is likely that the occupant has changed on the basis of a feature amount of the occupant obtained through the analysis.

(13) In any one of the aspects (1) to (12), the seat drive unit may further include a biasing mechanism that moves the seat using a biasing force applied to the seat, and a suppression mechanism that suppresses a movement speed of the seat due to the biasing mechanism, and when an operation is received by the second operation reception unit, the seat may be changed to a posture of the seat before the operation is received by the second operation reception unit, on the basis of the biasing force applied to the seat due to the biasing mechanism.

(14) In the aspect (13), the vehicle system may further include: a fixing portion that fixes the seat; and a protrusion mechanism that is inserted into a concave portion provided in the fixing portion, wherein the seat drive unit may cause the protrusion mechanism to protrude as the seat moves, and move the seat using a biasing force of the biasing mechanism to insert the protrusion mechanism into the concave portion and fix the seat when an operation is received by the second operation reception unit.

(15) A vehicle control method according to an aspect of the present invention includes: changing a position of a seat on which an occupant is seated on the basis of an operation received by a first operation reception unit; and returning the position of the seat to a position before being changed by the first operation reception unit when an operation is received by a second operation reception unit configured to is provided at a rearward position relative to a place corresponding to a central portion in a travel direction of a seating portion of the seat in a side member provided in a side portion of the seat.

(16) A vehicle control program according to an aspect of the present invention causes a vehicle-mounted computer to: change a position of a seat on which an occupant is seated on the basis of an operation received by a first operation reception unit, and return the position of the seat to a position before being changed by the first operation reception unit when an operation is received by a second operation reception unit configured to is provided at a rearward position relative to a place corresponding to a central portion in a travel direction of a seating portion of the seat in a side member provided in a side portion of the seat.

According to the aspects (1), (2), (15) or (16), the vehicle system can improve operability of the operation reception unit. Therefore, the occupant, for example, can easily operate the operation reception unit even in a state in which the backrest of the seat is tilted (in other words, a reclining angle is increased) for lying down.

According to the aspect (3), (5), or (6), the vehicle system can suppress an operation of the seat due to a wrong operation of the occupant.

According to the aspect (4), the occupant can easily recognize a position of the second operation reception unit even when the interior of the vehicle is dark. Further, the occupant can easily recognize the driving mode of the vehicle by seeing whether or not the second operation reception unit is lit.

According to the aspect (7) or (8), the vehicle system can perform switching from automatic driving to manual driving more safely.

According to the aspect (9), the vehicle system can rapidly change the posture of the seat to the posture of previous automatic driving.

According to the aspect (10), (11), or (12), the vehicle system can change the seat posture to a more appropriate seat posture.

According to the aspect (13) or (14), the vehicle system can cause the seat to return to an original posture in a short time using the biasing mechanism.

BRIEF DESCRIPTION OF THE DRAWINGS

FIG. 12 is a diagram illustrating a state in which the seat 310B is moved at the time of automatic driving.

DETAILED DESCRIPTION OF THE INVENTION

Hereinafter, an embodiment of a vehicle system, a vehicle control method, and a vehicle control program of the present invention will be described below with reference to the drawings. In the embodiment, the vehicle system is assumed to be applied to an automatically driven vehicle. Here, there is a degree of automatic driving. The degree of automatic driving can be determined, for example, on a scale of being equal to or higher than a predetermined reference or lower than a predetermined reference.

A case in which a degree of automatic driving equal to or higher than a predetermined reference is, for example, a case in which a degree of control is higher than in an adaptive cruise control system (ACC) or a lane keeping assistance system (LKAS) and a driving assistance device such as auto lane changing (ALC) or low speed car passing (LSP) operates, or a case in which automatic driving in which lane changing, merging, and branching are automatically performed is executed. A driving mode in which the degree of automatic driving is equal to or higher than a predetermined reference is an example of a "first driving mode". This predetermined reference can be arbitrarily set. Further, a case where the degree of automatic driving is lower than a predetermined reference is, for example, a case where manual driving is being executed or a case where only a driving assistance device such as ACC or LKAS is operating. A driving mode in which the degree of automatic driving is lower than a predetermined reference is an example of a "second driving mode". In the embodiment, it is assumed that the first driving mode is automatic driving in which lane changing, merging, and branching are automatically performed, and the second driving mode is manual driving.

First Embodiment

[Overall Configuration]

Figure 1:
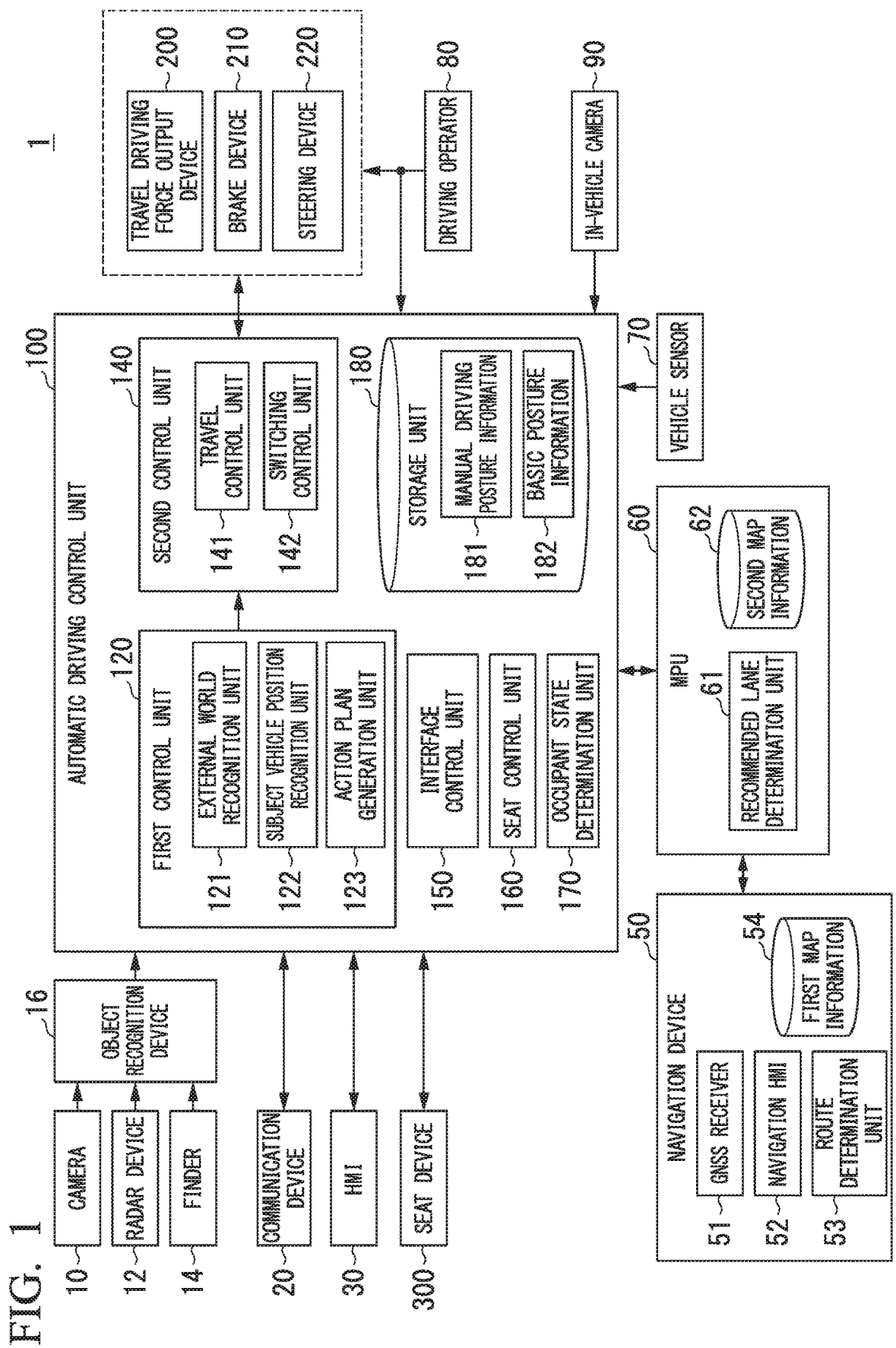
FIG. 1 is a configuration diagram of a vehicle system 1 according to a first embodiment.

FIG. 1 is a configuration diagram of a vehicle system 1 according to a first embodiment. A vehicle on which the vehicle system 1 is mounted (hereinafter referred to as a vehicle M) is, for example, a vehicle such as a two-wheeled, three-wheeled, or four-wheeled vehicle. A driving source thereof is an internal combustion engine such as a diesel engine or a gasoline engine, an electric motor, or a combination thereof. The electric motor is operated using power generated by a generator connected to the internal combustion engine, or discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, a vehicle sensor 70, a driving operator 80, an in-vehicle camera 90, an automatic driving control unit 100, a travel driving force output device 200, a brake device 210, a steering device 220, and a seat device 300. These devices are connected to each other by a multiplex communication line such as a controller area network (CAN) communication line, a serial communication line, a wireless communication network, or the like. A configuration illustrated in FIG. 1 is merely an example, and a part of the configuration may be omitted, or another configuration may be added. The in-vehicle camera 90 is an example of an "imaging unit".

The camera 10 is, for example, a digital camera using a solid-state imaging device such as a charge coupled device (CCD) or a complementary metal oxide semiconductor (CMOS). One or more cameras 10 are attached at arbitrary places on the vehicle M on which the vehicle system 1 is mounted. When in front thereof is imaged, the camera 10 is attached to an upper portion of a front windshield, a rear surface of an interior mirror, or the like. When the rear side is imaged, the camera 10 is attached to an upper portion of a rear windshield, a back door, or the like. When the side is imaged, the camera 10 is attached to a door mirror or the like. For example, the camera 10 periodically repeats imaging of the surroundings of the vehicle M. The camera 10 may be a stereo camera.

The radar device 12 radiates radio waves such as millimeter waves around the vehicle M and detects radio waves (reflected waves) reflected by an object to detect at least a position (a distance and a direction) to the object. One or more radar devices 12 are attached at arbitrary places on the vehicle M. The radar device 12 may detect the position and a speed of an object using a frequency modulated continuous wave (FMCW) scheme.

The finder 14 is a Light Detection and Ranging, or Laser Imaging Detection and Ranging (LIDAR) that measures scattered light with respect to irradiation light and detects a distance to an object. One or more finders 14 are attached at arbitrary positions on the vehicle M.

The object recognition device 16 performs a sensor fusion process on the detection results using some or all of the cameras 10, the radar devices 12, and the finders 14 to recognize the position, type, speed, and the like of an object. The object recognition device 16 outputs recognition results to the automatic driving control unit 100.

The communication device 20, for example, communicates with other vehicles present around the vehicle M using a cellular network, a Wi-Fi network, Bluetooth (registered trademark), Dedicated Short Range Communication (DSRC), or the like, or communicates with various server devices via a wireless station. Further, the communication device 20 communicates with a terminal device possessed by a person outside the vehicle.

The HMI 30 presents various types of information to an occupant in the vehicle and receives an input operation from the occupant. The HMI 30 is, for example, various display devices, speakers, buzzers, touch panels, various operation switches, keys, or the like.

The navigation device 50 includes, for example, a global navigation satellite system (GNSS) receiver 51, a navigation HMI 52, and a route determination unit 53, and stores first map information 54 in a storage device such as a hard disk drive (HDD) or a flash memory. The GNSS receiver specifies the position of the vehicle M on the basis of a signal received from the GNSS satellite. The position of the vehicle M may be specified or extrapolated by an inertial navigation system (INS) using an output of the vehicle sensor 70. The navigation HMI 52 includes a display device, a speaker, a touch panel, keys, or the like. The navigation HMI 52 may be partly or wholly shared with the above-described HMI 30. For example, the route determination unit 53 may determine a route to the destination input by the occupant using the navigation HMI 52 (including, for example, information on transit points at the time of traveling to the destination), from the position of the vehicle M specified by the GNSS receiver 51 (or an arbitrary input position), by referring to the first map information 54. The first map information 54 is, for example, information in which a road shape is expressed by a link indicating a road and nodes connected by a link. The first map information 54 may include a curvature of the road, Point Of Interest (POI) information, or the like. The route determined by the route determination unit 53 is output to the MPU 60. Further, the navigation device 50 may perform route guidance using the navigation HMI 52 on the basis of the route determined by the route determination unit 53. The navigation device 50 may be realized using a function of a terminal device such as a smartphone or a tablet terminal held by the user, for example. Further, the navigation device 50 may transmit a current position and the destination to the navigation server via the communication device 20, and acquire a route returned from the navigation server.

The MPU 60 functions as, for example, a recommended lane determination unit 61, and holds second map information 62 in the storage device such as an HDD or a flash memory. The recommended lane determination unit 61 divides the route provided from the navigation device 50 into a plurality of blocks (for example, divides the route every 100 [m] in a travel direction of the vehicle), and determines a recommended lane for each block by referring to the second map information 62. The recommended lane determination unit 61 determines which lane from the left the vehicle M travels on. The recommended lane determination unit 61 determines the recommended lane so that the vehicle M can travel on a reasonable travel route to a branch destination when there are branching points, merging points, or the like on the route.

The second map information 62 is map information with higher accuracy than the first map information 54. The second map information 62 includes, for example, information on a center of a lane or information on a boundary of a lane. Further, the second map information 62 may include road information, traffic regulation information, address information (address and postal code), facility information, telephone number information, and the like. The road information includes information indicating a type of a road, such as highways, toll roads, national roads, and prefectural roads, the number of lanes of roads, an area of an emergency parking zone, a width of each lane, a gradient of a road, a position of a road (three-dimensional coordinates including longitude, latitude, and height), curvatures of curves of lanes, positions of merging and branching points of a lane, or information on signs or the like provided on a road. The second map information 62 may be updated at any time by accessing another device using the communication device 20.

The vehicle sensor 70 includes a vehicle speed sensor that detects a current speed of the vehicle M, an acceleration sensor that detects an acceleration in the travel direction of the vehicle M, a yaw rate sensor that detects an angular speed around a vertical axis, a direction sensor that detects a direction of the vehicle M, and the like. For example, the acceleration includes at least one of a longitudinal acceleration in the travel direction of the vehicle M and a lateral acceleration in a lateral direction of the vehicle M.

The driving operator 80 includes, for example, an accelerator pedal, a brake pedal, a shift lever, a steering wheel, and other operators. A sensor that detects the amount of an operation or the presence or absence of an operation is attached to the driving operator 80, and a result of the detection is output to one or both of the automatic driving control unit 100, and the travel driving force output device 200, the brake device 210, and the steering device 220.

The in-vehicle camera 90, for example, images an occupant or the seat device 300 in the vehicle cabin. The in-vehicle camera 90, for example, periodically repeatedly images the interior of the vehicle M. A captured image of the in-vehicle camera 90 is output to the automatic driving control unit 100.

[Automatic Driving Control Unit]

The automatic driving control unit 100 includes, for example, a first control unit 120, a second control unit 140, an interface control unit 150, a seat control unit 160, an occupant state determination unit 170, and a storage unit 180. Each of the first control unit 120, the second control unit 140, the interface control unit 150, the seat control unit 160, and the occupant state determination unit 170 is realized by a processor such as a central processing unit (CPU) executing a program (software). Further, some or all of functional units from the first control unit 120, the second control unit 140, the interface control unit 150, the seat control unit 160, and the occupant state determination unit 170 to be described below may be realized by hardware such as a Large Scale Integration (LSI), an application specific integrated circuit (ASIC), or a field-programmable gate array (FPGA), or may be realized by software and hardware in cooperation. A combination of the seat control unit 160 and a seat drive unit 370 to be described below is an example of a "seat drive unit".

The first control unit 120 includes, for example, an external world recognition unit 121, a subject vehicle position recognition unit 122, and an action plan generation unit 123.

The external world recognition unit 121 recognizes a state such as a position, a speed, and an acceleration of a nearby vehicle on the basis of information input from the camera 10, the radar device 12, and the finder 14 via the object recognition device 16. The position of a nearby vehicle may be represented by a representative point such as a centroid or a corner of the nearby vehicle or may be represented by an area represented by an outline of the nearby vehicle. The "state" of a nearby vehicle may include an acceleration, a jerk, or a "state of action" of the nearby vehicle (for example, whether or not the nearby vehicle is changing lane or is about to change lane).

Further, the external world recognition unit 121 may recognize a position of a guardrail, a telephone pole, a parked vehicle, a pedestrian, or other objects, in addition to a nearby vehicle.

The subject vehicle position recognition unit 122 recognizes, for example, a lane (travel lane) along which the subject vehicle M is traveling, and a relative position and posture of the subject vehicle M relative to the travel lane. The subject vehicle position recognition unit 122, for example, compares a pattern (for example, an arrangement of solid lines and broken lines) of a road partition line obtained from the second map information 62 with a pattern of a road partition line near the subject vehicle M recognized from an image captured by the camera 10 to recognize a travel lane. In this recognition, the position of the subject vehicle M acquired from the navigation device 50 or a result of a process using an INS may be added.

Figure 2:
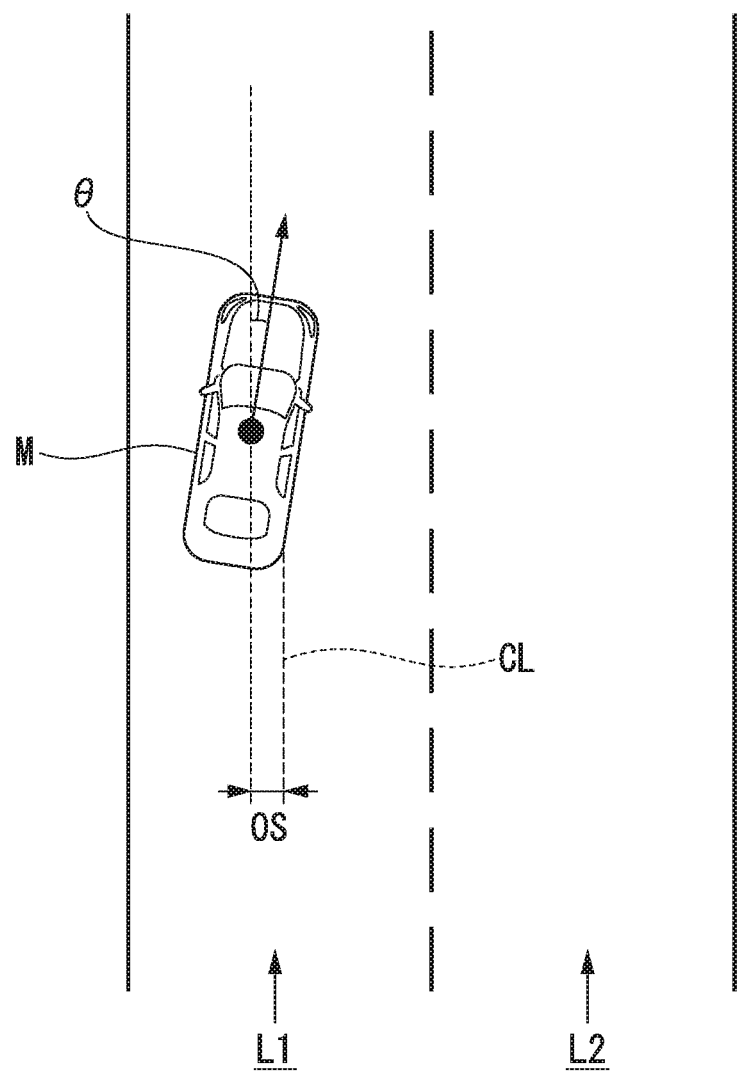
FIG. 2 is a diagram illustrating a state in which a relative position and a posture of a vehicle M relative to a travel lane L1 are recognized by a subject vehicle position recognition unit 122.

The subject vehicle position recognition unit 122 recognizes, for example, a position or a posture of the subject vehicle M relative to the travel lane. FIG. 2 is a diagram illustrating a state in which a relative position and posture of the subject vehicle M relative to the travel lane L1 are recognized by the subject vehicle position recognition unit 122. The subject vehicle position recognition unit 122, for example, recognizes a deviation OS of a reference point (for example, a centroid) of the subject vehicle M from a travel lane center CL and an angle $\theta$ of a travel direction of the subject vehicle M with respect to a line connecting the travel lane center CL as the relative position and posture of the subject vehicle M relative to the travel lane L1. Alternatively, the subject vehicle position recognition unit 122 may recognize, for example, a position of the reference point of the subject vehicle M relative to any one of side end portions of the travel lane L1 as a relative position of the subject vehicle M relative to the travel lane. The relative position of the subject vehicle M recognized by the subject vehicle position recognition unit 122 is provided to the recommended lane determination unit 61 and the action plan generation unit 123.

The action plan generation unit 123 generates an action plan for the vehicle M to performing automatic driving with respect to the destination or the like. The action plan generation unit 123 determines events to be sequentially executed in the automatic driving so that the vehicle M travels along a recommended lane determined by the recommended lane determination unit 61 and so that the vehicle M can cope with surrounding situations of the vehicle M. The events in the automatic driving of the first embodiment include, for example, a constant-speed traveling event in which a vehicle travels on the same travel lane at a constant speed, a lane changing event in which a travel lane of the vehicle M is changed, an overtaking event in which the vehicle M overtakes a preceding vehicle, a following traveling event in which the vehicle M travels following a vehicle, a merging event in which the vehicle M merges at a merging point, a branching event in which the vehicle M is caused to travel in a target direction at a branching point of the road, an emergency stopping event in which the vehicle M is caused to make an emergency stop, and a switching event in which automatic driving is ended and switching to manual driving is performed. Further, an action for avoidance may be planned on the basis of the surrounding situation of the vehicle M (presence of nearby vehicles or pedestrians, lane narrowing due to road construction, or the like) during execution of these events.

The action plan generation unit 123 generates a target trajectory along which the vehicle M will travel in the future. The target trajectory includes, for example, a speed element. For example, a plurality of future reference times may be set at predetermined sampling times (for example, every several tenths of a [sec]), and the target trajectory may be generated as a set of target points (trajectory points) at which a vehicle arrives at respective reference times. Thereby, this indicates that, when an interval between the trajectory points is great, the vehicle is traveling at high speed in a section between trajectory points.

Figure 3:
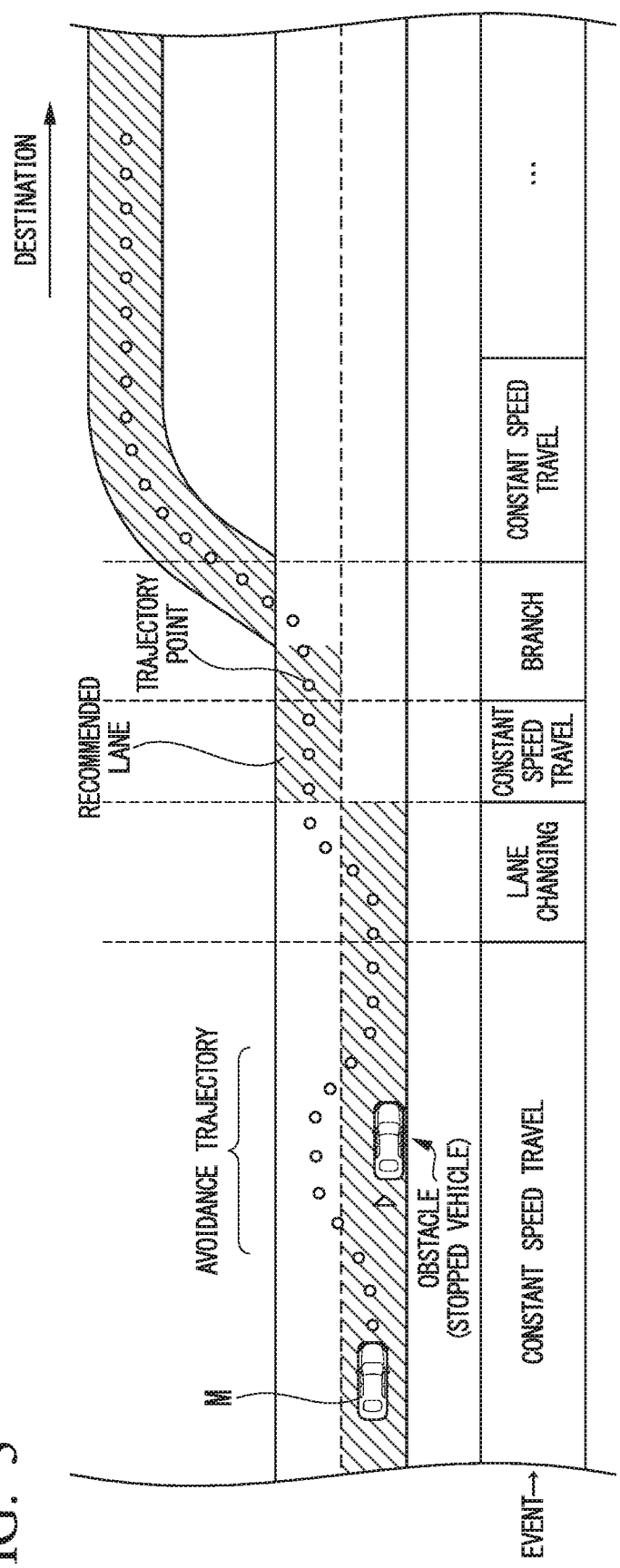
FIG. 3 is a diagram illustrating a state in which a target trajectory is generated on the basis of a recommended lane.

FIG. 3 is a diagram illustrating a state in which the target trajectory is generated on the basis of the recommended lane. As illustrated in FIG. 3, the recommended lane is set to be convenient for traveling along a route to a destination.

When the vehicle reaches a predetermined distance before the recommended lane switching point (which may be determined according to a type of the event), the action plan generation unit 123 activates a lane changing event, a branching event, a merging event, and the like. When it is necessary to avoid an obstacle during execution of one event, an avoidance trajectory is generated as illustrated in FIG. 3.

The action plan generation unit 123, for example, generates a plurality of target trajectory candidates, and selects an optimal target trajectory suitable for a route to a destination at that point in time on the basis of a viewpoint of safety and efficiency.

The second control unit 140 includes a travel control unit 141 and a switching control unit 142. The travel control unit 141 controls the travel driving force output device 200, the brake device 210, and the steering device 220 so that the vehicle M passes along the target trajectory generated by the action plan generation unit 123 according to scheduled times.

The switching control unit 142 switches the driving mode of the vehicle M on the basis of the action plan generated by the action plan generation unit 123. For example, the switching control unit 142 may switch the driving mode from manual driving to automatic driving at a scheduled start point of the automatic driving. Further, the switching control unit 142 may switch the driving mode from automatic driving to manual driving at a scheduled end point of the automatic driving.

Further, the switching control unit 142 may switch between automatic driving and manual driving on the basis of a switching signal input from an automatic driving changeover switch included in the HMI 30, for example. Further, the switching control unit 142 may switch the driving mode of the vehicle M from automatic driving to manual driving on the basis of an operation for instructing acceleration, deceleration, or steering with respect to the driving operator 80 such as an accelerator pedal, a brake pedal, or a steering wheel.

At the time of manual driving, input information from the driving operator 80 is output to the driving force output device 200, the brake device 210, and the steering device 220. Further, the input information from the driving operator 80 may be output to the driving force output device 200, the brake device 210, and the steering device 220 via the automatic driving control unit 100. Each electronic control unit (ECU) of the travel driving force output device 200, the brake device 210, and the steering device 220 performs each operation on the basis of the input information from the driving operator 80 or the like.

The interface control unit 150 outputs, for example, a notification regarding a traveling state at the time of automatic driving or manual driving of the vehicle M, a timing at which switching to automatic driving or manual driving is performed, or a request for causing the occupant to perform manual driving to the HMI 30. Further, the interface control unit 150 may cause the HMI 30 to output information on the control content in the seat control unit 160. Further, the interface control unit 150 may output the information received by the HMI 30 to the first control unit 120 or the seat control unit 160.

When an operation for changing the posture of the seat device 300 has been received by the operation switch 360 to be described below, the seat control unit 160 controls the seat device 300 on the basis of operation content. Further, the seat control unit 160 changes control content of the seat device 300 on the basis of the driving mode of the vehicle M. A function of the seat control unit 160 will be described below in detail.

The occupant state determination unit 170, for example, determines whether or not the occupant seated on the seat device 300 is in a state in which the occupant can perform manual driving. The occupant state determination unit 170 outputs a determination result to the seat control unit 160. A function of the occupant state determination unit 170 will be described below in detail.

The storage unit 180 is a storage device such as a hard disk drive (HDD), a flash memory, a random access memory (RAM), or a read only memory (ROM). The storage unit 180 stores, for example, manual driving posture information 181 and basic posture information 182. The manual driving posture information 181 is, for example, a slide position and a reclining angle of the seat device 300 at the time of manual driving. The slide position is a position in a longitudinal direction of the vehicle M. The reclining angle is an angle formed between the seating portion 330 and the backrest portion 340 of the seat device 300 which will be described below. The basic posture information 182 is a preset slide position and a preset reclining angle of a basic posture of the seat 310. The basic posture is a posture at which it is estimated that the occupant can see in the travel direction of the vehicle M or operate the driving operator 80 while seating on the seat 310. Each of the manual driving posture information 181 and the basic posture information 182 may include a position of the seat 310 in a vertical direction.

The travel driving force output device 200 outputs a travel driving force (torque) for causing the vehicle M to travel to driving wheels. The travel driving force output device 200 includes, for example, a combination of an internal combustion engine, an electric motor, and a transmission, and an ECU that controls the internal combustion engine, the electric motor, and the transmission. The ECU controls the above components according to information input from the travel control unit 141 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the travel control unit 141 or information input from the driving operator 80 so that a brake torque according to a braking operation is output to each wheel. The brake device 210 may include a mechanism that transfers the hydraulic pressure generated by an operation of the brake pedal included in the driving operator 80 to the cylinder via a master cylinder as a backup. The brake device 210 is not limited to the above-described configuration and may be an electronically controlled hydraulic brake device that controls an actuator according to information input from the travel control unit 141 or information input from the driving operator 80 to transfer the hydraulic pressure of the master cylinder to the cylinder. Further, the brake device 210 may include a plurality of brake device systems in consideration of safety.

The steering device 220 includes, for example, a steering ECU and an electric motor.

The electric motor, for example, applies a force to a rack and pinion mechanism to change a direction of a steered wheel. The steering ECU drives the electric motor according to the information input from the travel control unit 141 or information input from the driving operator 80 to change the direction of the steered wheel.

The seat device 300 is a seat on which an occupant of the vehicle M is seated, and is a seat that can be driven electrically, hydraulically, or the like. The seat device 300 includes, for example, a driver's seat, a passenger seat, a rear seat, and the like in which the driving operator 80 is provided. In the following description, the "seat device 300" is assumed to be a seat device on a driver's seat.

[Configuration and Control of Seat Device 300]

Figure 4:
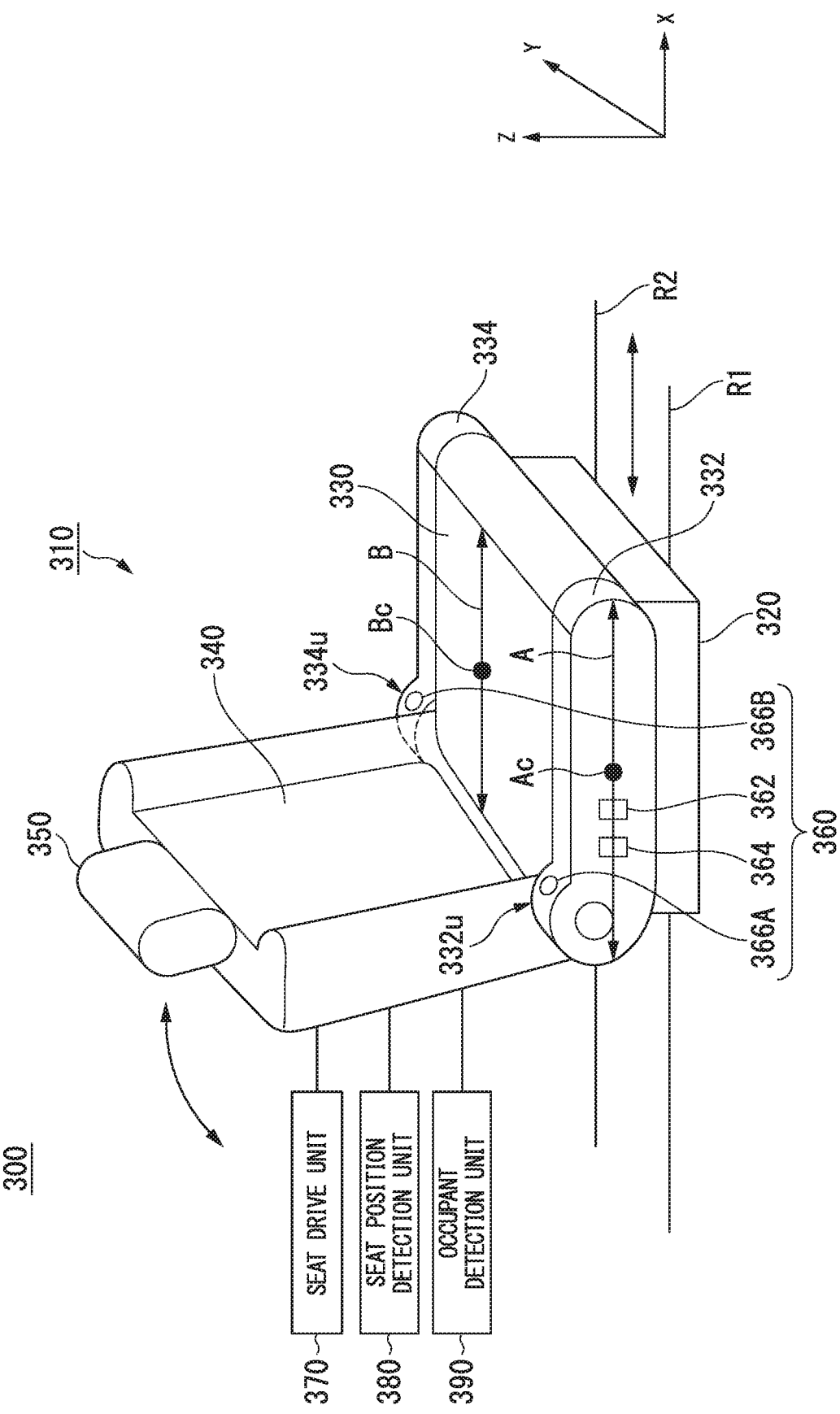
FIG. 4 is a configuration diagram of a seat device 300 according to the first embodiment.

Hereinafter, a configuration of the seat device 300 of the first embodiment and control of the seat device 300 in the seat control unit 160 will be specifically described. FIG. 4 is a configuration diagram of the seat device 300 according to the first embodiment. The seat device 300 includes, for example, a seat (seat body) 310, a seat drive unit 370, an operation switch 360, a seat position detection unit 380, and an occupant detection unit 390.

The seat 310 includes, for example, a pedestal portion 320, a seating portion 330, a backrest portion (backrest portion) 340, and a headrest 350. The pedestal portion 320 is installed on rails R1 and R2 extending in the longitudinal direction of the vehicle M installed in a bottom portion of a vehicle cabin, and is movable relative to the rails R1 and R2. Further, the pedestal portion 320 supports the seating portion 330 from below.

The seating portion 330 supports the occupant from below. Side members 332 and 334 are provided on left and right side portions of the seating portion 330 (an axis direction of a vehicle body is defined as a front-rear direction). The side members 332 and 334 extend to overlap a connection portion between the seating portion 330 and the backrest portion 340 when viewed in a side direction (Y-axis direction) of the seat device 300.

The backrest portion 340 supports a back of the occupant seated on the seating portion 330 from a rear side, an obliquely rear side, or a lower side according to the reclining angle. The headrest 350 supports a head or a neck of the occupant seated on the seating portion 330.

The operation switch 360 includes, for example, a slide switch 362, a reclining switch 364, and two return switches 366A and 366B. The slide switch 362 and the reclining switch 364 are adjustment switches for causing the occupant to adjust a posture of the seat 310, and are an example of a "first operation reception unit". The return switches 366A and 366B are an example of a "second operation reception unit".

The slide switch 362 receives, for example, an operation of sliding and moving the seat 310 on the rails R1 and R2. The reclining switch 364 receives an operation for changing the reclining angle. The slide switch 362 and the reclining switch 364 are installed, for example, on the side of the side member 332 or 334 (in a Y-axis direction in FIG. 4 and a direction orthogonal to the travel direction of the vehicle M).

The return switches 366A and 366B receive, for example, an operation for causing the seat 310 to return to a posture at the time of manual driving. On the basis of the received operation, the seat drive unit 370 changes the slide position of the seat 310 and changes the reclining angle to cause the seat 310 to return to the posture at the time of manual driving.

The return switches 366A and 366B are provided, for example, at positions behind a place corresponding to a central portion in a travel direction of the seating portion 330 in the side members 332 and 334 of the seat 310. The place corresponding to the central portion is, for example, a center point of a line segment indicating a length of the seating portion 330 when the seating portion 330 is viewed from the side face (Y direction), for example, a center point Ac of a straight line A parallel to the X axis. The central portion of the seating portion 330 may be a center point of a line segment indicating the length of the seating portion 330 when the seating portion 330 is viewed from the upper surface (−Z direction), for example, a center point Bc of a straight line B parallel to the X axis. Further, the position behind the center portion is, for example, a position on the backrest portion 340 side relative to a position of at least one of the center points Ac and Bc. An area in a predetermined range with reference to the position behind the central portion as well as the position behind the central portion may be included. The return switches 366A and 366B are provided, for example, on upper surface sides 332*u* and 334*u* of the side members 332 and 334.

For example, when an operation has been received by the operation switch 360, the seat drive unit 370 drives a motor or the like to change the posture of the seat 310. For example, the seat drive unit 370 moves the seat 310 toward the front side (X direction) or the rear side (−X direction) of the vehicle M on the rails R1 and R2 on the basis of the operation received by the slide switch 362 or moves the backrest portion 340 so that the reclining angle of the seat 310 increases or decreases on the basis of the operation received by the reclining switch 364.

Further, the seat drive unit 370 may validate or invalidate the operation content received by the return switches 366A and 366B on the basis of the information acquired from the seat control unit 160. For example, the seat control unit 160 may output information for validating the operation received by the return switches 366A and 366B to the seat drive unit 370 when the driving mode of the vehicle M is automatic driving, and output information for invalidating the operation received by the return switches 366A and 366B to the seat drive unit 370 when the driving mode of the vehicle M is manual driving. Thus, the seat control unit 160 validates the return switches 366A and 366B only at the time of automatic driving, such that malfunction of the seat 310 can be prevented when the return switches 366A and 366B are wrongly operated during manual driving.

The seat position detection unit 380 detects the slide position and the reclining angle of the seat 310, for example. The seat position detection unit 380 outputs a detection result to the seat control unit 160.

The occupant detection unit 390 detects that an occupant is seated on the seat 310. For example, when a load detected by one or more load sensors provided on the seating portion 330 or the backrest portion 340 is equal to or greater than a threshold value, the occupant detection unit 390 detects that an occupant is seated on the seat 310. Further, the occupant detection unit 390 detects that an occupant has changed when the load exceeds the threshold value again after the load on the seat 310 becomes equal to or smaller than the threshold value after a state in which the load on the seat 310 exceeds the threshold value.

Further, the occupant detection unit 390 may analyze an image captured by the in-vehicle camera 90, and detects that a person is seated on the seat 310 from a feature amount obtained from an edge, an edge pattern, and the like, a feature amount obtained from light and darkness, color, and a color histogram, and a feature amount obtained from a shape or a size. Further, the occupant detection unit 390 may use pattern matching, that is, use an outline obtained by removing an outer edge line of the seat from an outline of a series of edges as an outline of the object, and detect the object as a person when the outline has a predetermined size or balance. Further, the occupant detection unit 390 may detect that the occupant has changed when the feature amount, a size of the outline, or the like is different by a predetermined value or more from that when a person was detected at a previous time.

Figure 5:
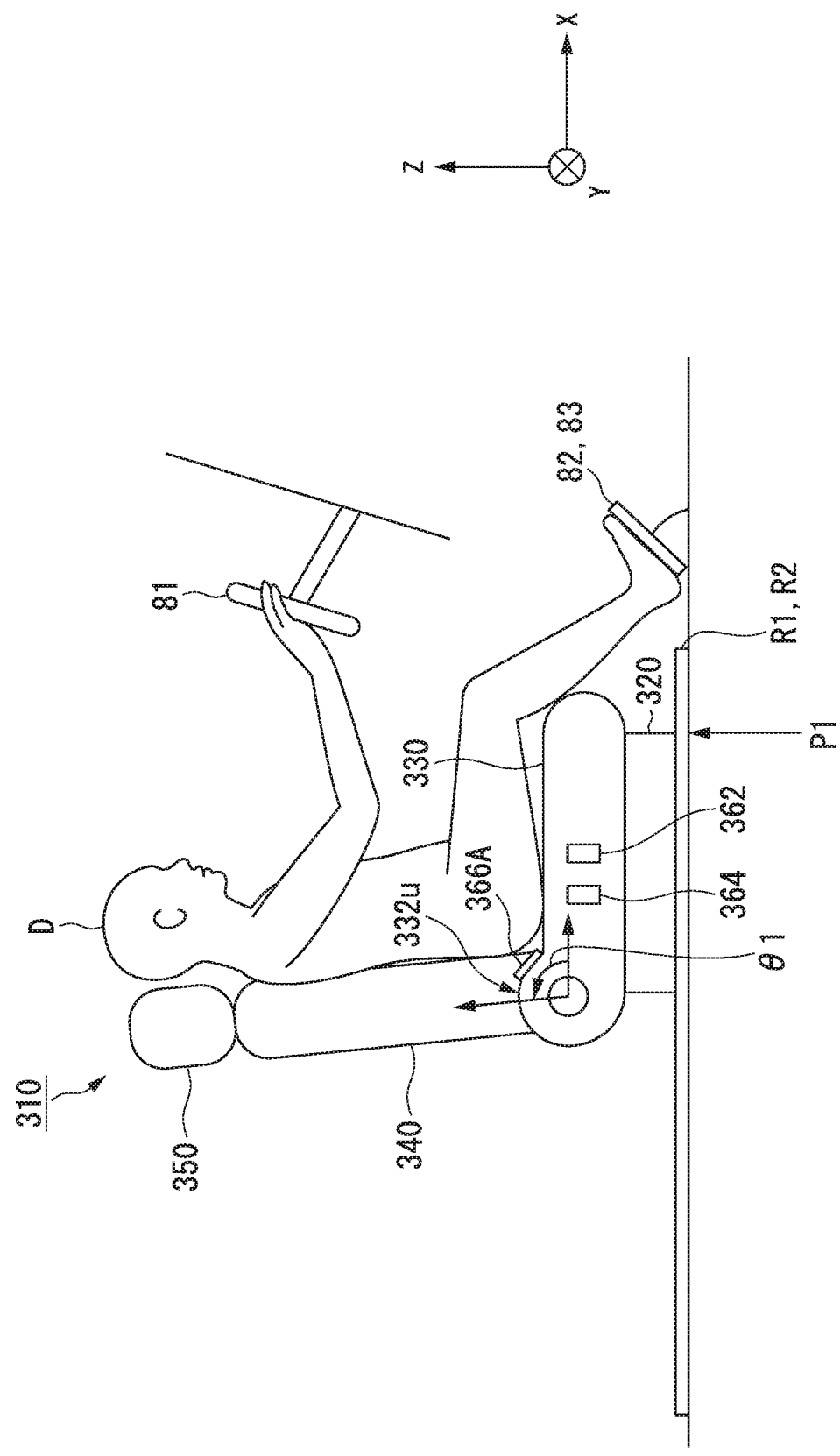
FIG. 5 is a diagram illustrating a posture of a seat 310 at the time of manual driving.

Next, an operation of the seat 310 in the first embodiment will be described. FIG. 5 is a diagram illustrating the posture of the seat 310 at the time of manual driving. In FIG. 5, a steering wheel 81, an accelerator pedal 82, and a brake pedal 83 are shown as an example of the driving operator 80.

For example, before the operation of the vehicle M starts, an occupant D operates the slide switch 362 and the reclining switch 364 to move the seat 310 to a position at which the steering wheel 81, the accelerator pedal 82, and the brake pedal 83 can be operated, and starts manual driving after completion of the movement.

Here, when the driving mode of the vehicle M is switched from manual driving to automatic driving, the seat control unit 160 stores a current slide position P1 and the reclining angle θ1 of the seat 310 detected by the seat position detection unit 380 in the storage unit 180 as manual driving posture information 181. Further, when the driving mode of the vehicle M is switched from manual driving to automatic driving, the seat drive unit 370 changes the posture of the seat 310 on the basis of an operation received by the slide switch 362 and the reclining switch 364.

Figure 6:
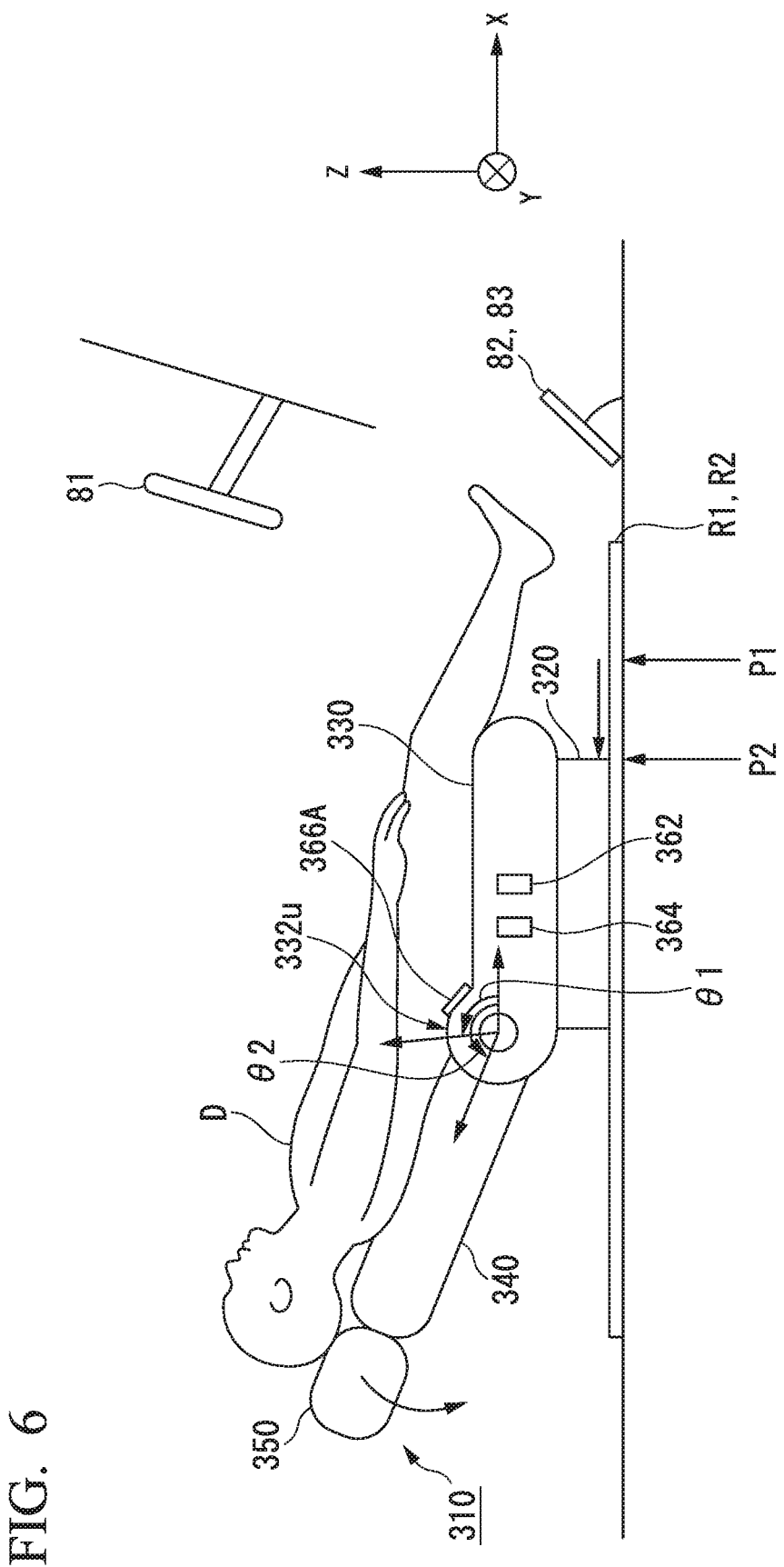
FIG. 6 is a diagram illustrating an operation of the seat 310 at the time of automatic driving.

FIG. 6 is a diagram illustrating an operation of the seat 310 at the time of automatic driving. In the example of FIG. 6, the seat drive unit 370 moves the slide position of the seat 310 from P1 to P2 on the basis of the operation received by the slide switch 362, and changes the reclining angle of the seat 310 from θ1 to θ2 on the basis of the operation received by the reclining switch 364. θ2 is an angle at which the backrest portion 340 is tilted to the extent that the occupant D can lie down.

For example, when the posture of the seat 310 returns to the posture at the time of manual driving, the occupant D operates the return switches 366A and 366B. The return switches 366A and 366B are respectively provided on the upper surface sides 332u and 334u of the side members 332 and 334. Therefore, the occupant D can easily operate the return switches 366A and 366B even in a state in which the backrest portion 340 is tilted for lying down.

When the operation has been received by the return switches 366A and 366B, the seat control unit 160 controls the seat drive unit 370 such that the posture of the seat 310 is changed to the slide position P1 and the reclining angle θ1 included in the manual driving posture information 181 stored in the storage unit 180 by referring to the manual driving posture information 181. Thus, the occupant D can cause the posture of the seat 310 to change to the posture at the time of manual driving by easily operating the return switches 366A and 366B even when the backrest portion 340 is tilted for lying down.

Further, in the first embodiment, the return switches 366A and 366B include lighting members. The lighting member is, for example, a light emitting unit such as a light emitting diode (LED). For example, the light emitting unit may be provided inside the return switches 366A and 366B. In this case, the return switches 366A and 366B each have an opening in a portion of a surface thereof. Thus, when the light emitting unit emits light, light leaks from the opening to the outside, and the return switches 366A and 366B are lit. Further, the return switches 366A and 366B may include a transparent or translucent outer member. Accordingly, internally emitted light is transmitted through the outer member, and the return switches 366A and 366B are lit. Further, the light emitting unit may be provided around the return switches 366A and 366B.

When the vehicle M is executing automatic driving, the seat control unit 160 causes the light emitting unit to emit light and turns on the return switches 366A and 366B. Thus, the occupant D can easily recognize the positions of the return switches 366A and 366B, for example, even when the vehicle cabin is dark. Further, the occupant D can easily recognize whether the vehicle M is executing automatic driving or manual driving by viewing whether or not the return switches 366A and 366B are turned on.

Further, for example, when at least one of the two return switches 366A and 366B is operated for a predetermined time (for example, three seconds or more), the seat control unit 160 validates the operation received by the return switches 366A and 366B and causes the posture of the seat 310 to return to the posture stored in the manual driving posture information 181. Thus, if the occupant D has unintentionally briefly operated the return switches 366A and 366B, the operation received by the return switches 366A and 366B is not validated, and accordingly, the seat control unit 160 can prevent malfunction of the seat 310.

Further, alternatively, when both of the two return switches 366A and 366B are operated, the seat control unit 160 may cause the posture of the seat 310 to return to the posture stored in the manual driving posture information 181. In this case, the seat control unit 160 may determine that both of the return switches 366A and 366B have been operated when a time over which both of the return switches 366A and 366B are operated is continuously equal to or longer than a predetermined time. Accordingly, if the occupant D unintentionally operates either one of the return switches 366A and 366B, the operation received by the return switches 366A and 366B is not validated, and accordingly, the seat control unit 160 can prevent malfunction of the seat 310. Further, it is necessary for the occupant D to be in a posture in which pressing both of the return switches 366A and 366B provided in the left and right side members 332 and 334 of the seating portion 330 is possible. Therefore, when both of the return switches 366A and 366B are operated, the seat control unit 160 validates the operation content, such that a posture in which an upper body of the occupant D may be easily raised can be facilitated before changing the posture of the seat 310 is started.

The above-described return switch may be one switch. In this case, when the one return switch is operated, the seat control unit 160 causes the posture of the seat 310 to return to the posture stored in the manual driving posture information 181. Further, three or more return switches may be used. In this case, when at least two of the return switches are operated, the seat control unit 160 may cause the posture of the seat 310 to return to the posture stored in the manual driving posture information 181. When all of the return switches are operated or when one of the return switches is operated, the posture of the seat 310 may return to the posture stored in the manual driving posture information 181.

Further, for example, when the occupant state determination unit 170 determines that the posture of the occupant D of the seat 310 is a posture in which performing manual driving is possible, the seat control unit 160 permits the switching control unit 142 to perform switching to manual driving. For example, the occupant state determination unit 170 may first determine whether or not a certain amount of operation (for example, a small operation of the steering wheel 81 generated by gripping the steering wheel 81) has been performed by the occupant D with respect to a sensor attached to the steering wheel 81, the accelerator pedal 82, or the brake pedal 83. When it is determined that a certain amount of operation has been performed by the occupant D, the occupant state determination unit 170 determines that the occupant D is in a state in which the occupant D can drive the vehicle M.

Further, the occupant state determination unit 170 may determine the state of the occupant D on the basis of the image captured by the in-vehicle camera 90. Specifically, the occupant state determination unit 170 analyzes the image captured by the in-vehicle camera 90, and detects the position of the head of the occupant D included in the image. The occupant state determination unit 170 may detect a direction of a face of the occupant D, and a position of each part of a body such as a hand or a foot. Further, the occupant state determination unit 170 determines that the occupant D is in a state in which the occupant D can perform manual driving when (1) the direction of the face of the occupant D is the travel direction (for example, the X direction) of the vehicle M, and any one of (2) an interval between a position of a hand of the occupant D and a position of the steering wheel 81 is determined to be equal to or smaller than a predetermined value and (3) an interval between a position of a foot of the occupant D and a position of the accelerator pedal 82 or the brake pedal 83 is determined to be equal to or smaller than a predetermined value (any one of (2) and (3)). Thus, the occupant state determination unit 170 can perform switching from automatic driving to manual driving more safely.

Further, the seat control unit 160 causes the switching control unit 142 to perform switching from automatic driving to manual driving when an operation has been received by the return switches 366A and 366B again after the posture of the seat 310 returns to the posture of the seat at the time of the manual driving on the basis of the operation received by the return switches 366A and 366B. Accordingly, the seat control unit 160 can perform switching from automatic driving to manual driving more safely.

Further, the seat control unit 160, for example, may store the slide position and the reclining angle of the seat 310 at the time of automatic driving in the storage unit 180 as automatic driving posture information (not illustrated), and may cause the posture of the seat 310 to return to the posture of the seat 310 at the time of previous automatic driving by referring to the automatic driving posture information without returning the posture of the seat 310 to the posture at the time of manual driving when an operation has been received by the return switches 366A and 366B without a change in the slide position or the reclining angle of the seat 310 after the vehicle M is switched from manual driving to automatic driving. Accordingly, it is possible to rapidly change the posture to the posture of the previous automatic driving.

Further, when the occupant detection unit 390 detects that it is likely that the occupant D seated on the seat 310 has changed to another occupant at the time of automatic driving and an operation has been received by the return switches 366A and 366B, the seat control unit 160 changes the posture of the seat 310 to the basic posture on the basis of the basic posture information 182 stored in the storage unit 180.

When the other occupant desires to change the posture of the seat 310 changed to the basic posture, the other occupant operates the slide switch 362 and the reclining switch 364.

Further, when the seat control unit 160 sets the seat device 300 to the basic posture, the seat control unit 160 deletes the manual driving posture information 181 stored in the storage unit 180. The deletion of the manual driving posture information 181 is also applied, for example, when an occupant b is seated on the seat device 300 after an occupant a has been seated on the seat device 300, and then, the occupant a is seated again. For example, identification of each occupant may be performed by analyzing the image of the in-vehicle camera 90, or may be performed by an occupant inputting his or her identification information. Thus, it is possible to prevent the posture of the seat 310 from being changed using the manual driving posture information 181 set by another occupant.

[Process Flow]

Figure 7:
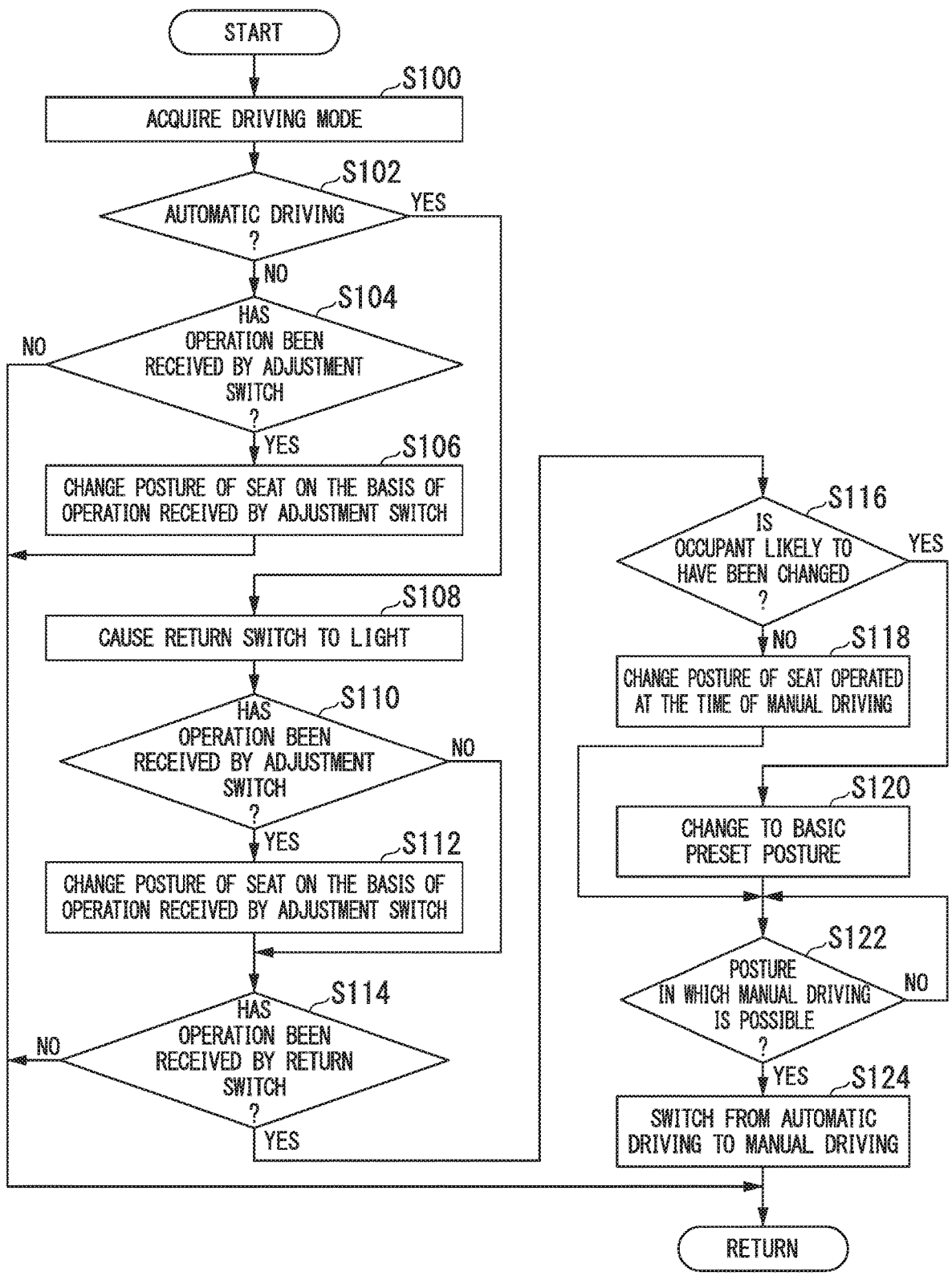
FIG. 7 is a flowchart illustrating a flow of seat control according to the first embodiment.

Hereinafter, a flow of the seat control of the first embodiment will be described. FIG. 7 is a flowchart illustrating the flow of the seat control according to the first embodiment. The flowchart illustrated in FIG. 7 is periodically repeatedly executed in driving control of the vehicle M. In the example of FIG. 7, the seat control unit 160 acquires the driving mode of the vehicle M (step S100) and determines whether or not the acquired driving mode is automatic driving (step S102).

When the driving mode is not automatic driving, the driving mode of the vehicle M is manual driving. In this case, the seat control unit 160 determines whether an operation of the occupant D has been received by the adjustment switch (the slide switch 362 and the reclining switch 364) (step S104). When the operation of the occupant D has been received by the adjustment switch, the seat control unit 160 changes the posture of the seat 310 on the basis of the operation received by the adjustment switch (step S106). In step S106, the seat control unit 160 stores changed posture information in the storage unit 180 as the manual driving posture information 181.

Further, when the driving mode of the vehicle M is automatic driving in the process of step S102, the seat control unit 160 causes the return switches 366A and 366B to light (step S108).

Then, the seat control unit 160 determines whether or not an operation of the occupant D has been received by the adjustment switch (step S110). When the operation of the occupant D has been received by the adjustment switch, the seat control unit 160 changes the posture of the seat 310 on the basis of the operation received by the adjustment switch (step S112).

Then, the seat control unit 160 determines whether or not the operation of the occupant D has been received by the return switches 366A and 366B (step S114). When the operation of the occupant D has been received by the return switches 366A and 366B, the seat control unit 160 determines whether or not the occupant D seated on the seat 310 is likely to have changed (step S116). When it is not likely that the occupant D seated on the seat 310 has changed, the seat control unit 160 changes the posture of the seat 310 to the posture of the seat 310 operating at the time of manual driving on the basis of the manual driving posture information 181 stored in the storage unit 180 (step S118). Further, when it is likely that the occupant D seated on the seat 310 has changed, the seat control unit 160 determines the posture of the seat 310 as a basic preset posture on the basis of the basic posture information 182 stored in the storage unit 180 (step S120).

After the processes of steps S118 and S120, the occupant state determination unit 170 determines whether or not the posture of the occupant D is a posture in which performing manual driving is possible (step S122). When the occupant state determination unit 170 determines that the posture of the occupant D is not a posture in which performing manual driving is possible, the occupant state determination unit 170 waits until the posture of the occupant is a posture in which performing manual driving is possible. In this case, the interface control unit 150 may output information for requesting the occupant D to take the posture in which manual driving is possible to a display screen of the HMI 30, or may output sound. Further, the first control unit 120 may perform emergency stop control through automatic driving when the occupant D is not in the posture in which manual driving is possible even if a predetermined time has elapsed. Further, when the occupant state determination unit 170 determines that the posture of the occupant D is the posture in which manual driving is possible, the switching control unit 142 switches the driving mode from automatic driving to manual driving (step S124). Accordingly, the process of this flowchart ends.

FIRST MODIFICATION EXAMPLE

Figure 8:
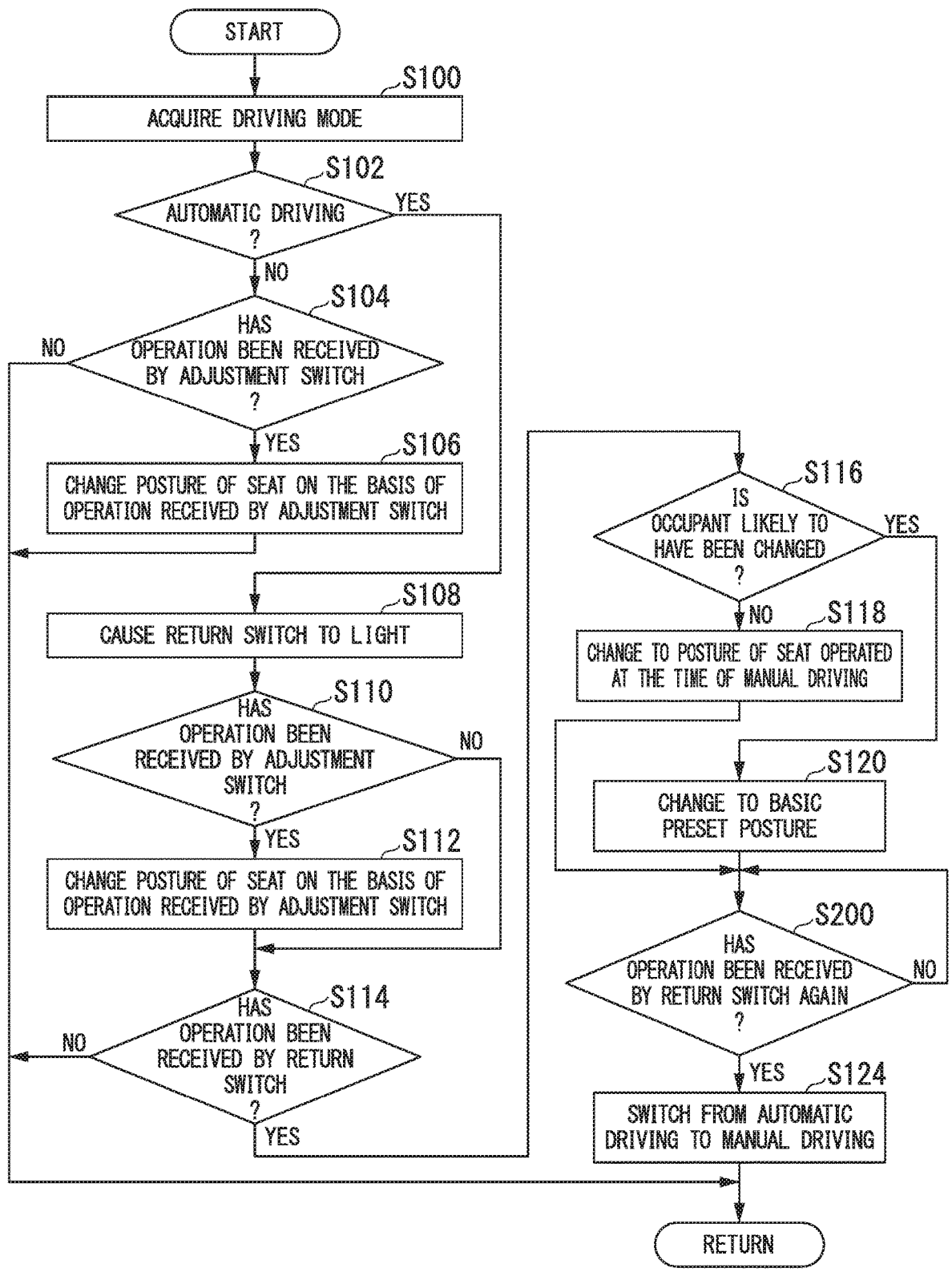
FIG. 8 is a flowchart illustrating a first modification example of a flow of seat control according to the first embodiment.

FIG. 8 is a flowchart illustrating a first modification example of a flow of seat control according to the first embodiment. The flowchart illustrated in FIG. 8 includes a process of step S200 instead of step S122, as compared with the flowchart illustrated in FIG. 7. Therefore, hereinafter, the process of step S200 will be described, and description of other processes will be omitted.

In the example of FIG. 8, after the process in step S118 or step S120, the seat control unit 160 determines whether or not the operation of the occupant D has been received by the return switches 366A and 366B again (step S200). When the operation of the occupant D has not been received by the return switches 366A and 366B again, the seat control unit 160 waits until the operation of the occupant D has been received by the return switches 366A and 366B again. In this case, the interface control unit 150 may output information for requesting the occupant D to operate the return switches 366A and 366B when the occupant D is in a posture in which manual driving is possible on the display screen of the HMI 30 or output sound. Further, the first control unit 120 may perform emergency stop control through automatic driving when the return switches 366A and 366B are not operated even after a predetermined time has elapsed. When the operation of the occupant D has been received by the return switches 366A and 366B again, the switching control unit 142 switches driving from automatic driving to manual driving (step S124).

According to the first modification example described above, since the vehicle system 1 switches the driving mode to manual driving after changing the posture of the seat using the return switches 366A and 366B and then receiving the operation from the return switches 366A and 366B again, it is possible to switch driving to manual driving at a timing of the occupant D operating the return switches 366A and 366B. Therefore, the vehicle system 1 can switch driving to automatic driving more safely.

SECOND MODIFICATION EXAMPLE

Figure 9:
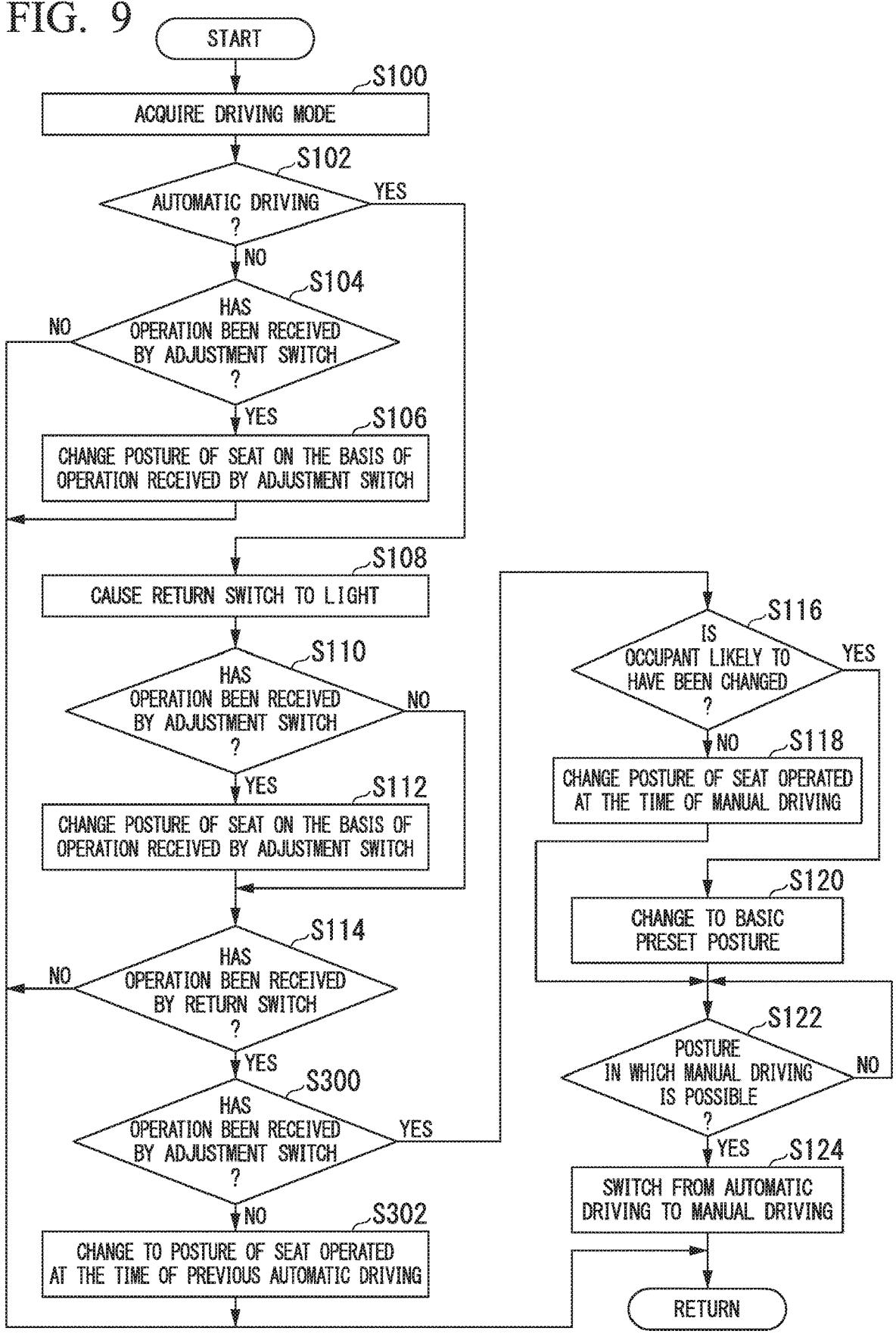
FIG. 9 is a flowchart illustrating a second modification example of a flow of seat control according to the first embodiment.

FIG. 9 is a flowchart illustrating a second modification example of the flow of the seat control according to the first embodiment. The flowchart illustrated in FIG. 9 differs from the flowchart illustrated in FIG. 7 in that processes of steps S300 and S302 are added in addition to steps S100 to S124. Therefore, hereinafter, the process of steps S300 and S302 will be described, and description of other processes will be omitted.

In the example of FIG. 9, the seat control unit 160 determines whether or not the operation of the occupant D has been received by the return switches 366A and 366B (step S114). When the operation of the occupant D has been received by the return switches 366A and 366B, the seat control unit 160 determines whether or not the operation has been received by the adjustment switch after switching from manual driving to automatic driving (step S300). When the operation has been received by the adjustment switch, processes of step S116 and step S124 are performed. When the operation has not been received by the adjustment switch, the seat control unit 160 changes the posture of the seat 310 to the posture of the seat operated at the time of the previous automatic driving (step S302). In this case, the seat control unit 160 stores the posture of the seat at the time of the previous automatic driving in the storage unit 180 as automatic driving posture information, and changes the posture of the seat by referring to the automatic driving posture information at the time of execution of the process of step S302.

According to the second modification described above, the seat control unit 160 can rapidly change the posture of the seat 310 to the posture at the time of previous automatic driving. Further, the vehicle system 1 can not only switch the posture of the seat to the posture at the time of manual driving, but also switch the posture of the seat to the posture at the time of previous automatic driving using the return switches 366A and 366B.

According to the first embodiment described above, it is possible to improve the operability of the switch. For example, since the return switch 366 is at a reachable position even in a state in which the occupant D tilts the backrest portion 340 for lying down when the vehicle M is executing automatic driving, the occupant D can easily operate the return switch 366 and rapidly cause the posture of the seat 310 to return to the posture at the time of manual driving.

Second Embodiment

Next, a seat device of a second embodiment will be described. Hereinafter, a configuration and operation of the seat will be described, and other configurations are assumed to be the same as in the first embodiment.

Figure 10:
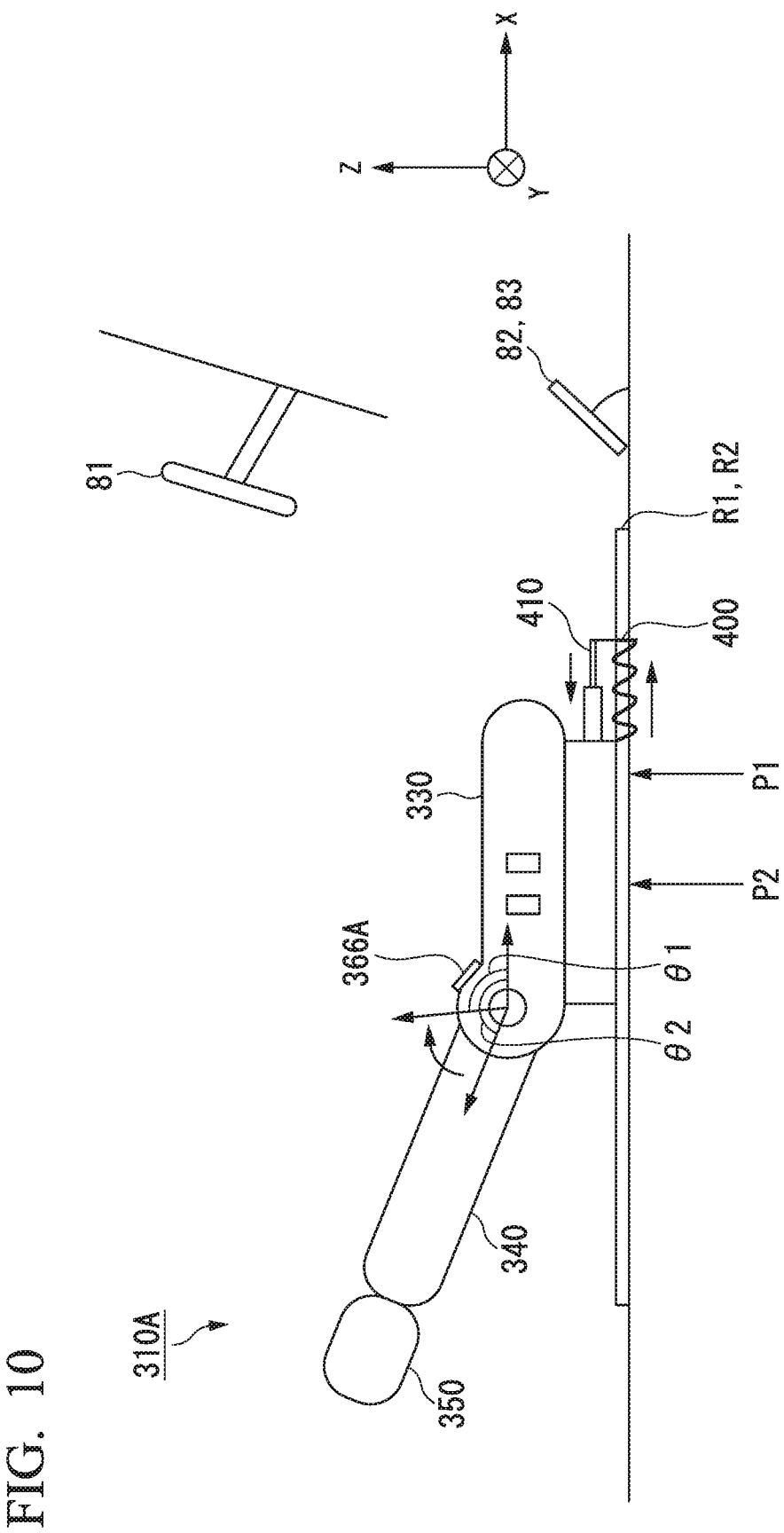
FIG. 10 is a diagram illustrating an operation of a seat 310A of a second embodiment.

FIG. 10 is a diagram illustrating an operation of a seat 310A according to the second embodiment. The seat 310A of the second embodiment further includes a spring mechanism 400 and a damper mechanism 410 as compared with the seat 310 of the first embodiment. In the example of FIG. 10, although the spring mechanism 400 and the damper mechanism 410 are displayed as overlapping in a Z-axis direction, the spring mechanism 400 and the damper mechanism 410 may be arranged side by side on a bottom surface (for example, on a Y-axis) of the vehicle M. Further, the spring mechanism 400 and the damper mechanism 410 may be installed under rails R1 and R2. The spring mechanism 400 is an example of a "biasing mechanism". The damper mechanism 410 is an example of a "suppression mechanism".

One end of the spring mechanism 400 is installed in the rails R1 and R2 or a bottom surface of the vehicle cabin, and the other end is installed on the pedestal portion 320 of the seat 310A. For example, one end of the spring mechanism 400 may generate a biasing force toward the front side (X-direction) of the vehicle M to the seat 310 when the seat 310A is pulled toward the rear side (-X direction) of the vehicle M. In the second embodiment, an elastic member such as rubber may be used instead of the spring mechanism 400.

One end of the damper mechanism 410 is installed on the rails R1 and R2 or the bottom surface in the vehicle cabin, and the other end thereof is installed on the pedestal portion 320 of the seat 310A. When the seat 310A moves to the front side of the vehicle M due to the biasing force of the spring mechanism 400, the damper mechanism 410 suppresses a movement speed of the seat 310A. A suppression force of the damper mechanism 410 is smaller than the biasing force of the spring mechanism 400.

Further, in the seat 310A according to the second embodiment, the spring mechanism 400 and the damper mechanism 410 described above may be attached to a mechanism for adjusting the reclining angle. In this case, for example, one end of the spring mechanism 400 and the damper mechanism 410 of the seat 310A is fixed to the backrest portion 340 and the other end is fixed to the seating portion 330. Accordingly, when the reclining angle is changed on the basis of the operation received by the return switch 366, the seat control unit 160 can change the reclining angle by applying the biasing force of the spring mechanism 400 and the suppression force of the damper mechanism 410.

According to the second embodiment described above, when the operation is received by the return switch 366, the seat control unit 160 can cause the seat 310A to return to the original posture in a short time by applying not only a driving force of a motor or the like but also a biasing force of the spring mechanism 400 to move the seat 310A. Therefore, there is flexibility for the occupant D to assume a posture for performing manual driving.

Third Embodiment

Next, a seat device of a third embodiment will be described. Hereinafter, a configuration and operation of a seat will be described, and other configurations are assumed to be the same as in the second embodiment.

Figure 11:
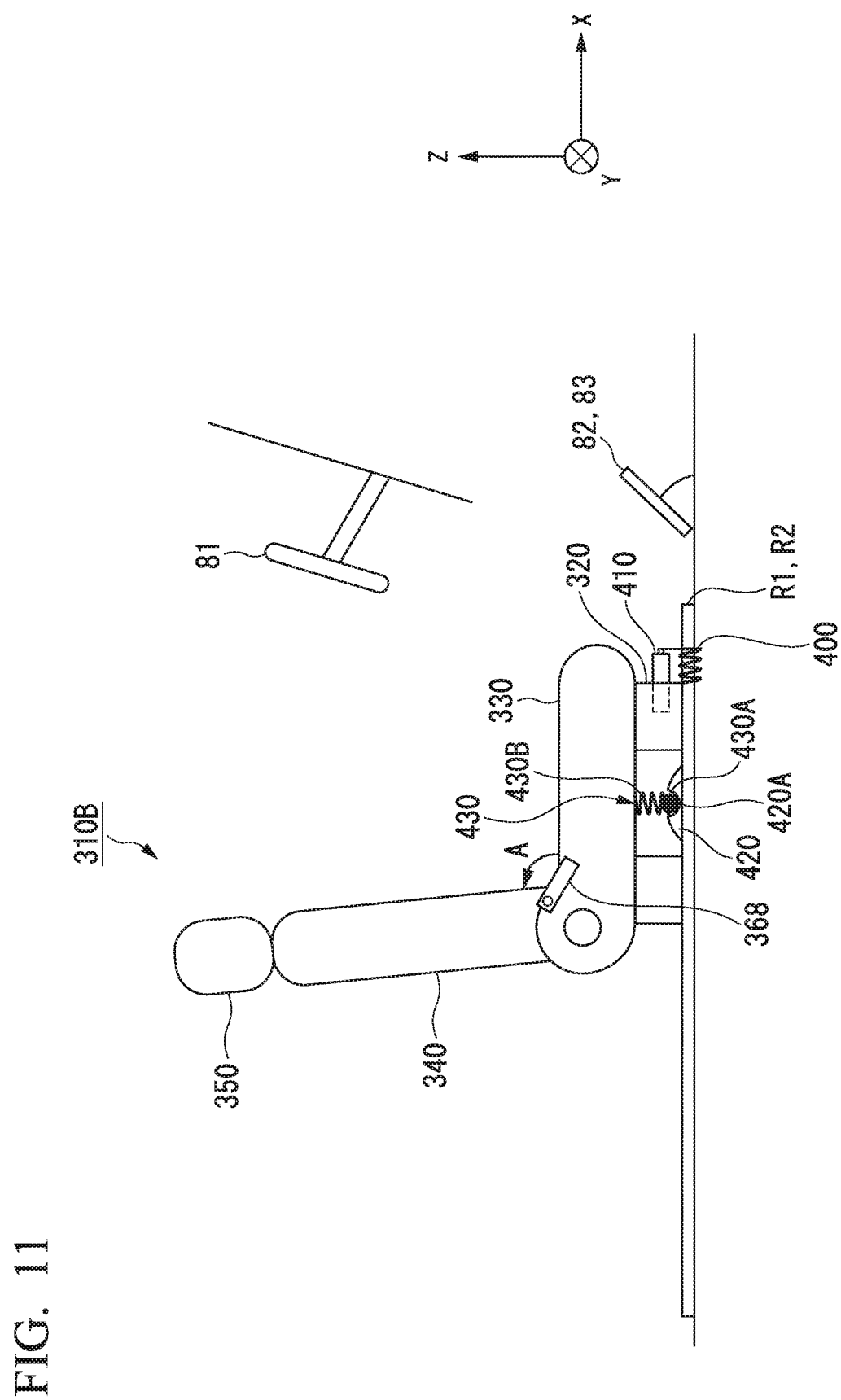
FIG. 11 is a diagram illustrating a state at the time of manual driving of a seat 310B according to a third embodiment.

FIG. 11 is a diagram illustrating a state at the time of manual driving of a seat 310B according to the third embodiment. The seat 310B of the third embodiment includes a slide operation lever 368 for adjusting a slide position instead of the slide switch 362, the reclining switch 364, and the return switch 366, as compared with the seat 310A of the second embodiment. Further, the seat 310B includes a protrusion mechanism 430 for fixing the position on a fixing portion 420 provided on a rail.

The slide operation lever 368 is installed, for example, at a position at which the return switch 366 described above is installed or at a position in the vicinity thereof. The slide operation lever 368 is a lever for adjusting a relative position of the rails R1 and R2 and the seat 310B and fixing the seat 310B at the adjusted slide position.

The occupant D can adjust the sliding position of the seat 310B by applying a load to the seat 310B in the longitudinal direction of the vehicle M in a state in which the occupant D has moved the slide operation lever 368 by a predetermined angle or more in a direction of the arrow A. Further, the occupant D causes the slide operation lever 368 to return to an original position to fix the slide position.

The protrusion mechanism 430 is fixed to, for example, the pedestal portion 320 of the seat 310. Further, in the protrusion mechanism 430, for example, a distal end portion 430A is formed in a spherical shape. A biasing force is applied to the distal end portion 430A downwardly (-Z direction) from the seat 310B by the spring member 430B. For example, the fixing portion 420 is provided with a concave portion 420A. When the distal end portion 430A of the protrusion mechanism 430 is inserted into the concave portion 420A, the protrusion mechanism 430 is gripped by an inner wall of the concave portion 420A, and the seat 310B is fixed.

FIG. 12 is a diagram illustrating a state in which the seat 310B is moved at the time of automatic driving.

In an example of FIG. 12, a diagram in which the occupant D moves the seat 310B toward a rear side (in a -X direction) in the vehicle M is illustrated. For example, when the vehicle M is executing automatic driving and the occupant D operates the slide operation lever 368 to move the seat 310B toward the rear side, the fixing portion 420 is fixed at a position before start of automatic driving, and accordingly, the distal end portion 430A of the protrusion mechanism 430 comes out of the concave portion 420A of the fixing portion 420. In this case, the distal end portion 430A of the protrusion mechanism 430 protrudes toward a lower side of the seat 310B due to a biasing force in a down direction of the spring member 430B.

Further, in this state, when the slide operation lever 368 is caused to return to an original position, the seat 310B is fixed. In this case, a biasing force is applied to the seat 310B toward the front side of the vehicle M by the spring mechanism 400.

When the seat 310B returns to the original position, the occupant D moves the slide operation lever 368 in a direction indicated by the arrow A by a predetermined angle or more. Accordingly, fixing of the seat 310B is released, and the seat 310B is pulled by the spring mechanism 400 and moved toward a front side (X direction) of the vehicle M. Further, when the seat 310B is moved toward the front side of the vehicle M, the movement speed due to the biasing force of the spring mechanism 400 is suppressed by the damper mechanism 410. When the seat 310B is moved and the distal end portion 430A of the protrusion mechanism 430 is inserted into the concave portion 420A of the fixing portion 420, the seat 310B is fixed. Accordingly, the seat 310B can quickly return to the posture before the movement.

In the above-described example, the movement of the slide position of the seat 310B has been described. However, the adjustment of the reclining angle in the third embodiment can be realized by providing the same mechanism for changing the reclining angle of the seat 310B. In this case, in the seat 310B, a reclining operation lever corresponding to the slide operation lever 368 described above is installed at positions at which the return switches 366A and 366B are installed or in the vicinity thereof. Further, in the seat 310B, the same mechanism as the fixing portion 420 and the protrusion mechanism 430 is installed in a mechanism for adjusting the reclining angle. Accordingly, in the seat 310B, the reclining angle of the seat 310B can be easily caused to return to the original posture by receiving the operation of the reclining operation lever.

According to the third embodiment described above, the occupant D can easily cause the seat 310B to return to an original posture using the operation lever, the fixing portion 420, and the protrusion mechanism 430. Each of the first to third embodiments described above may be combined with some or all of the other embodiments.

Although forms for carrying out the present invention have been described above using the embodiments, the present invention is not limited to the embodiments in any way, and various modifications and substitutions may be made without departing from the spirit of the present invention.

What is claimed is:

1. A vehicle system comprising:
    a seat on which an occupant of a vehicle is seated;
    a switching control unit configured to control switching between a first driving mode in which a degree of automatic driving of the vehicle is equal to or greater than a predetermined value and a second driving mode in which the degree of automatic driving of the vehicle is less than the predetermined value;
    a first operation reception unit and a second operation reception unit configured to be operated by the occupant; and
    a seat drive unit configured to, in a case where the switching control unit controls switching of the first driving mode, change a position of the seat on the basis of an operation received by the first operation reception unit, and return the position of the seat to a position before being changed by the first operation reception unit when an operation is received by the second operation reception unit,
    wherein the second operation reception unit is provided at a rearward position relative to a place corresponding to a central portion in a travel direction of a seating portion of the seat in a side member provided in a side portion of the seat is validated in a case where the switching control unit controls switching to the first driving mode, and is invalidated in a case where the switching control unit controls switching to the second driving mode.

2. The vehicle system according to claim 1,
    wherein the second operation reception unit is provided on the upper surface side of the side member.

3. The vehicle system according to claim 1,
    wherein the second operation reception unit is capable of lighting, and
    the seat drive unit causes the second operation reception unit to light when the first driving mode is being executed.

4. The vehicle system according to claim 1,
    wherein the seat drive unit returns the posture of the seat changed by the operation received by the first operation reception unit to a posture before the change when the operation by the second operation reception unit has been received for a predetermined time or more.

5. The vehicle system according to claim 1, comprising:
    a plurality of second operation reception units,
    wherein the seat drive unit returns the posture of the seat changed by the operation received by the first operation reception unit to a posture before the change when operations have been received by the plurality of second operation reception units.

6. The vehicle system according to claim 1, further comprising:
    an occupant state determination unit configured to determine whether the occupant is in a posture in which driving the vehicle is possible,
    wherein the seat drive unit permits the switching control unit to perform switching from the first driving mode to the second driving mode when the occupant state determination unit determines that the occupant is in the posture in which driving the vehicle is possible.

7. The vehicle system according to claim 6,
    wherein the seat drive unit permits the switching control unit to perform switching from the first driving mode to the second driving mode when an operation is received by the second operation reception unit again after the posture of the seat changed by the first operation reception unit returns to the posture before the change on the basis of the operation received by the second operation reception unit.

8. The vehicle system according to claim 6,
    wherein the seat drive unit returns the posture of the seat changed by the operation received by the first operation reception unit to the posture before the change when the operation is received by the second operation reception unit, and changes the posture of the seat to a posture of the seat when the first driving mode is executed in a case in which the operation is received by the second operation reception unit after the switching control unit performs switching from the first driving mode to the second driving mode.

9. The vehicle system according to claim 1, further comprising:
    an occupant detection unit configured to detect that it is likely that an occupant seated on the seat has changed to another occupant,
    wherein the seat drive unit changes the posture of the seat to a preset basic posture when the occupant detection unit determines that it is likely that the occupant seated on the seat has changed to another occupant and when the operation has been received by the second operation reception unit.

10. The vehicle system according to claim 9,
    wherein the occupant detection unit detects a load on the seat, and detects that it is likely that the occupant has changed when the detected load on the seat exceeds a threshold value again after the load on the seat is equal to or smaller than the threshold value from a state in which the load on the seat exceeds the threshold value.

11. The vehicle system according to claim 9, further comprising:
    an imaging unit configured to image the inside of a vehicle cabin of the vehicle,
    wherein the occupant detection unit analyzes an image obtained from the imaging unit, and detects that it is likely that the occupant has changed on the basis of a feature amount of the occupant obtained through the analysis.

12. The vehicle system according to claim 1,
    wherein the seat drive unit further includes a biasing mechanism that moves the seat using a biasing force applied to the seat, and a suppression mechanism that suppresses a movement speed of the seat due to the biasing mechanism, and
    when an operation is received by the second operation reception unit, the seat is changed to a posture of the seat before the operation is received by the second operation reception unit, on the basis of the biasing force applied to the seat due to the biasing mechanism.

13. The vehicle system according to claim 12, further comprising:
a fixing portion that fixes the seat; and
a protrusion mechanism that is inserted into a concave portion provided in the fixing portion,
wherein the seat drive unit causes the protrusion mechanism to protrude as the seat moves, and moves the seat using a biasing force of the biasing mechanism to insert the protrusion mechanism into the concave portion and fix the seat when an operation is received by the second operation reception unit.

14. The vehicle system according to claim 1,
wherein the first operation reception unit is installed on a side surface of the side member.

15. The vehicle system according to claim 1, further comprising:
a storage unit configured to store the position of the seat in the second driving mode,
wherein the seat is able to be returned to the position of the seat stored in the storage unit, based on the operation of the second operation reception unit.

16. The vehicle system according to claim 1, further comprising:
a storage unit configured to store the position of the seat in the second driving mode,
wherein the seat is able to be changed from the position of the seat stored in the storage unit to a position of the seat where the occupant can lie down, based on the operation of the first operation reception unit.

17. A vehicle control method comprising:
switching between a first driving mode in which a degree of automatic driving of a vehicle is equal to or greater than a predetermined value and a second driving mode in which the degree of automatic driving of the vehicle is less than the predetermined value;
changing a position of a seat on which an occupant is seated on the basis of an operation received by a first operation reception unit;
returning the position of the seat to a position before being changed by the first operation reception unit when an operation is received by a second operation reception unit configured to is provided at a rearward position relative to a place corresponding to a central portion in a travel direction of a seating portion of the seat in a side member provided in a side portion of the seat;
validating the operation of the second operation reception unit in a case where the vehicle is switched to the first driving mode; and
invalidating the operation of the second operation reception unit in a case where the vehicle is switched to the second driving mode.

18. A vehicle control program that causes a vehicle-mounted computer to:
switch between a first driving mode in which a degree of automatic driving of a vehicle is equal to or greater than a predetermined value and a second driving mode in which the degree of automatic driving of the vehicle is lower than the predetermined value;
change a position of a seat on which an occupant is seated on the basis of an operation received by a first operation reception unit,
return the position of the seat to a position before being changed by the first operation reception unit when an operation is received by a second operation reception unit configured to is provided at a rearward position relative to a place corresponding to a central portion in a travel direction of a seating portion of the seat in a side member provided in a side portion of the seat;
validate the operation of the second operation reception unit in a case where the vehicle is switched to the first driving mode; and
in validate the operation of the second operation reception unit in a case where the vehicle is switched to the second driving mode.

* * * * *